United States Patent
Wakamatsu

(10) Patent No.: US 7,336,738 B2
(45) Date of Patent: Feb. 26, 2008

(54) DEMODULATION TIMING GENERATION CIRCUIT AND DEMODULATION APPARATUS

(75) Inventor: Masataka Wakamatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 711 days.

(21) Appl. No.: 10/344,429

(22) PCT Filed: Jun. 14, 2002

(86) PCT No.: PCT/JP02/05940

§ 371 (c)(1),
(2), (4) Date: Aug. 1, 2003

(87) PCT Pub. No.: WO02/103947

PCT Pub. Date: Dec. 27, 2002

(65) Prior Publication Data

US 2004/0052319 A1 Mar. 18, 2004

(30) Foreign Application Priority Data

Jun. 15, 2001 (JP) .............................. 2001-182548
Feb. 27, 2002 (JP) .............................. 2002-50819

(51) Int. Cl.
*H03D 1/00* (2006.01)
*H04L 27/06* (2006.01)
(52) U.S. Cl. ........................ 375/343; 375/345; 370/335
(58) Field of Classification Search ................ 375/343, 375/345; 370/320, 335, 342, 441, 479, 515; 708/422, 813, 819
See application file for complete search history.

(56) References Cited

U.S. PATENT DOCUMENTS 4,393,458 A * 7/1983 Fung ........................... 714/701
4,884,227 A * 11/1989 Watanabe .................... 702/141

(Continued)

FOREIGN PATENT DOCUMENTS

EP 1 005 204 5/2000

(Continued)

OTHER PUBLICATIONS

Baoguo Yang et al: "Timing Recovery for OFDM Transmission" IEEE Journal on Selected Areas in Communications, IEEE Service Center, Piscataway, US, vol. 18, No. 11, Nov. 2000, XP011055250.

*Primary Examiner*—Temesghen Ghebretinsae
(74) *Attorney, Agent, or Firm*—Frommer Lawrence & Haug LLP; Willaim S. Frommer; Thomas F. Presson

(57) ABSTRACT

A demodulation timing generation circuit capable of generating correctly and with high precision a timing for demodulating a reception signal even under various kinds of reception conditions and a demodulation apparatus using the same, wherein AGC control and frequency offset correction are performed by the burst detector 109 and the amplification gain controller 111 using a synchronization training signal (burst signal) added to the head of the reception signal (packet), a detection window period is provided for cross-correlation detection to detect the peak of the cross-correlation in the detection window DW by the timing controller 110, and in the end (rear edge) of the window, data corresponding to the peak position is loaded in the counter 11003 for counting the OFDM symbol interval. Due to this, it is possible to set an optimal FFT timing irrespective of the condition of a channel.

37 Claims, 35 Drawing Sheets

U.S. PATENT DOCUMENTS

| | | | |
|---|---|---|---|
| 5,579,335 A * | 11/1996 | Sutterlin et al. | 375/150 |
| 5,717,713 A * | 2/1998 | Natali | 375/149 |
| 5,920,278 A * | 7/1999 | Tyler et al. | 342/33 |
| 5,953,649 A * | 9/1999 | Junell | 455/67.11 |
| 5,974,083 A * | 10/1999 | Fujita | 375/130 |
| 6,681,199 B2 * | 1/2004 | Imai et al. | 702/189 |
| 7,062,282 B2 * | 6/2006 | Liu et al. | 455/502 |
| 2002/0152054 A1 * | 10/2002 | Imai et al. | 702/189 |
| 2002/0181622 A1 * | 12/2002 | Boutros et al. | 375/343 |

FOREIGN PATENT DOCUMENTS

| | | |
|---|---|---|
| EP | 1 041 790 | 10/2000 |
| EP | 1 049 302 | 11/2000 |
| JP | 10-098438 | 4/1998 |
| JP | 11-088455 | 3/1999 |
| JP | 11205278 A * | 7/1999 |
| JP | 2000-138647 | 5/2000 |
| JP | 2000-341244 | 12/2000 |
| JP | 2000-349736 | 12/2000 |
| JP | 2001-148679 | 5/2001 |
| JP | 2001-156743 | 6/2001 |
| JP | 2001-217802 | 8/2001 |
| JP | 2002-204214 | 7/2002 |

* cited by examiner

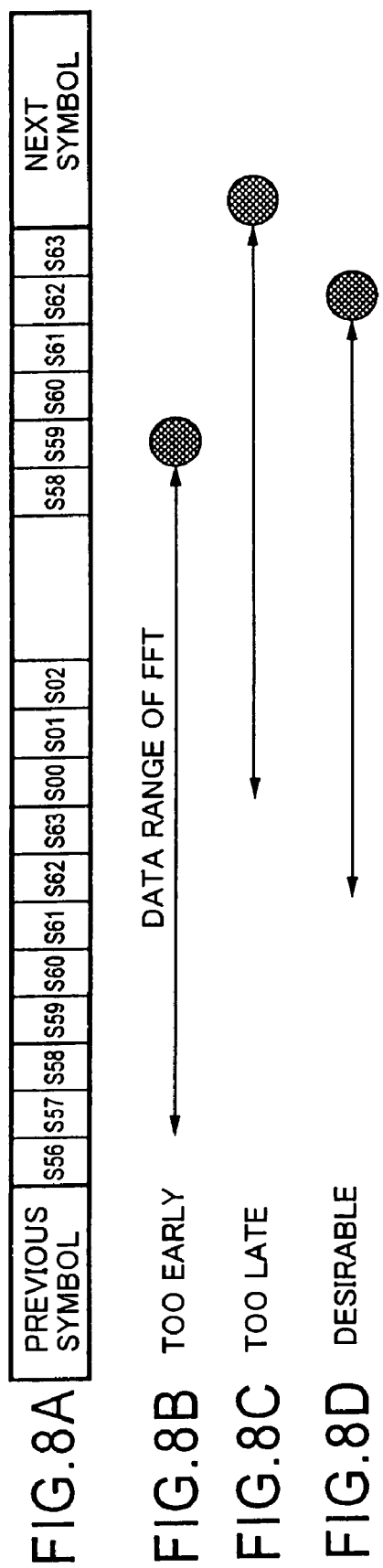

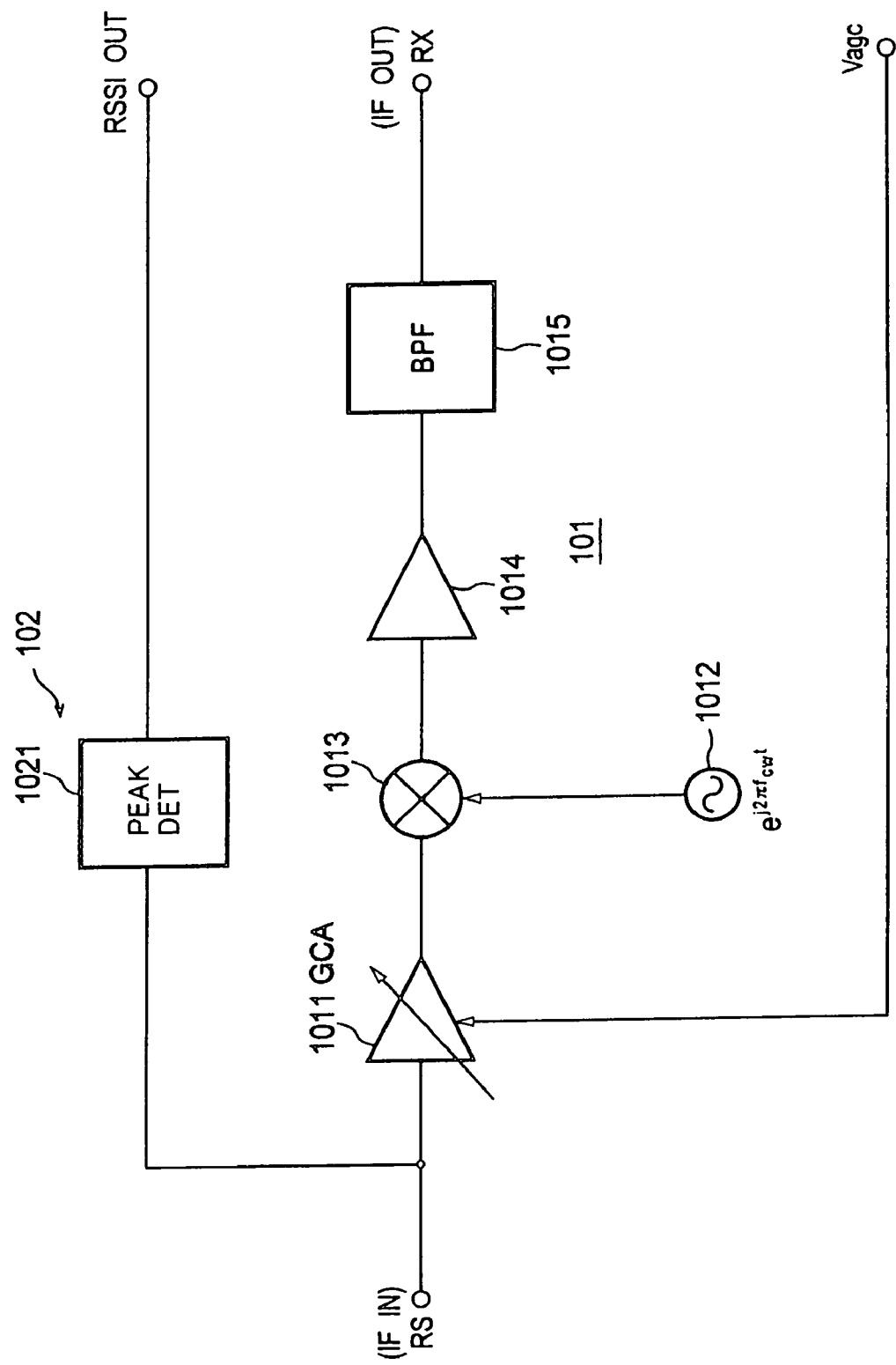

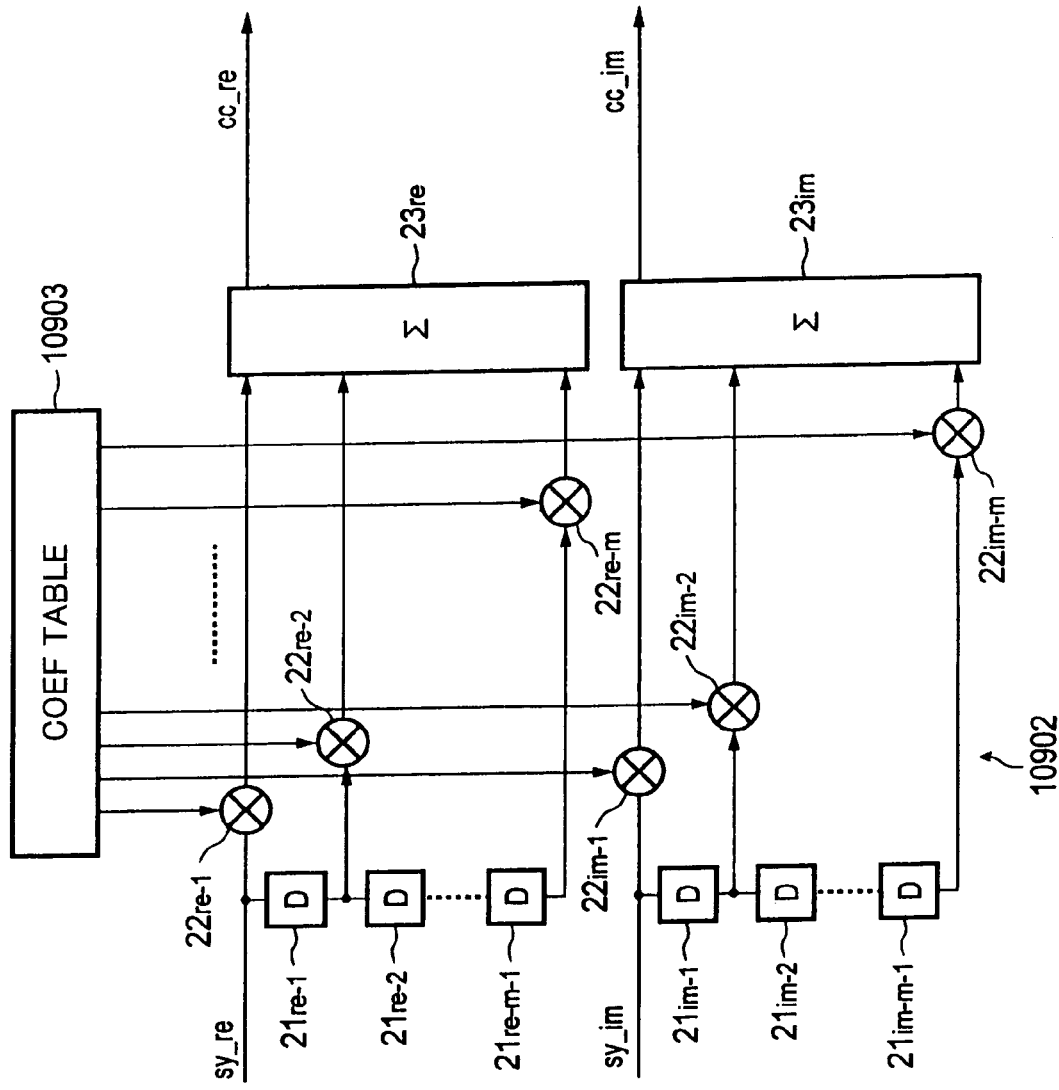

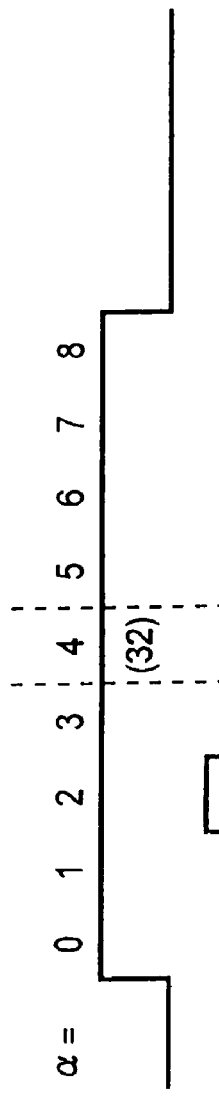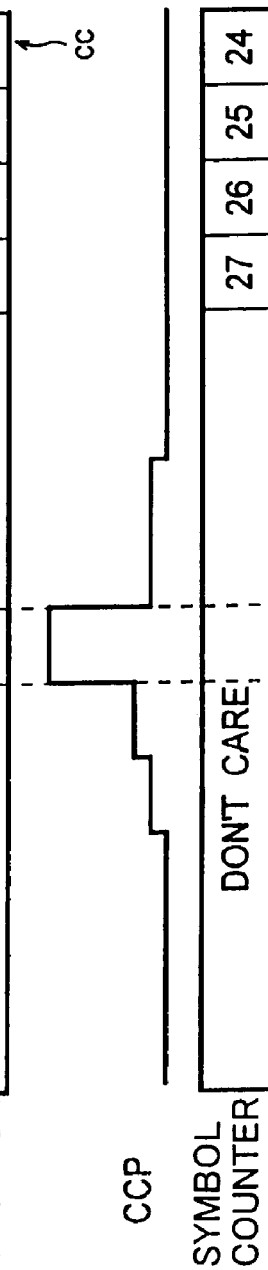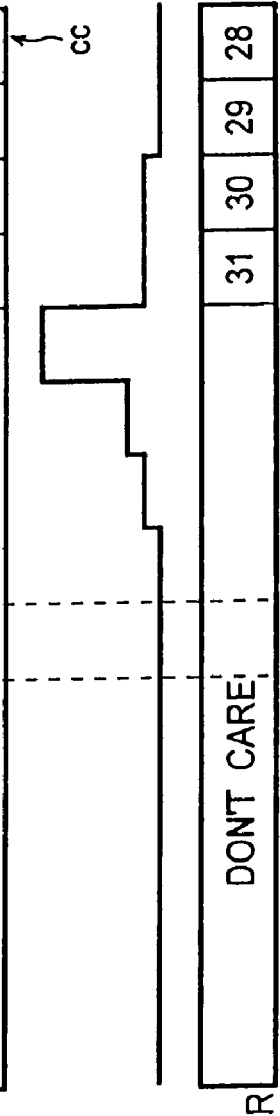

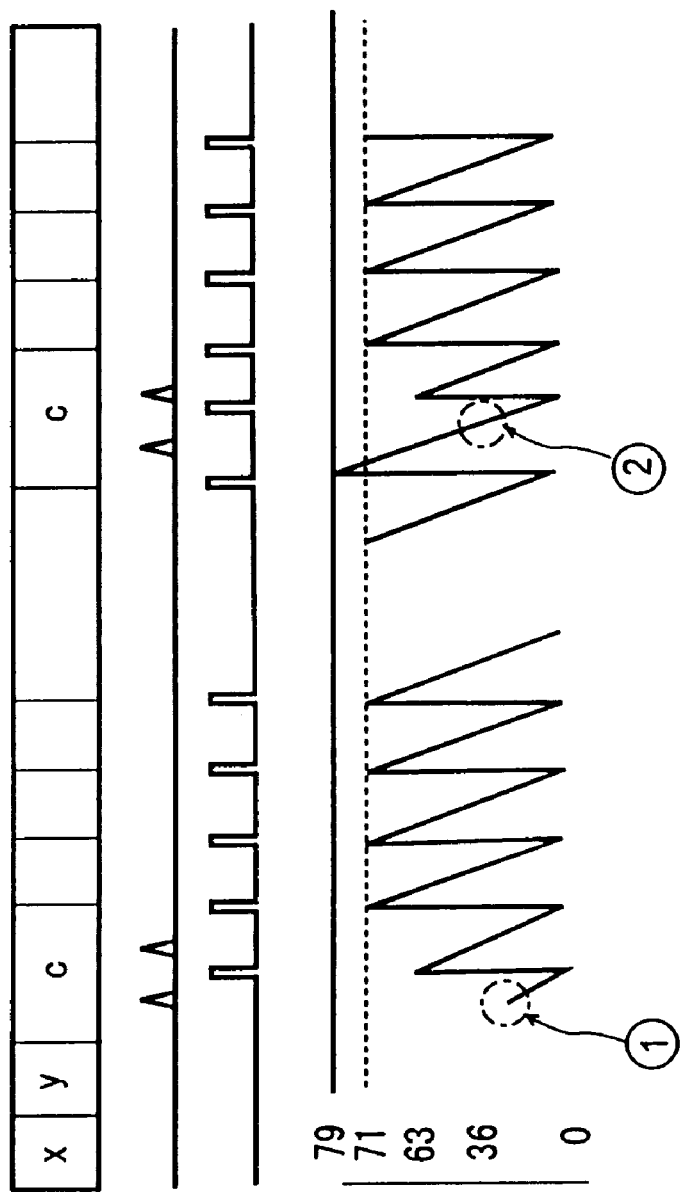

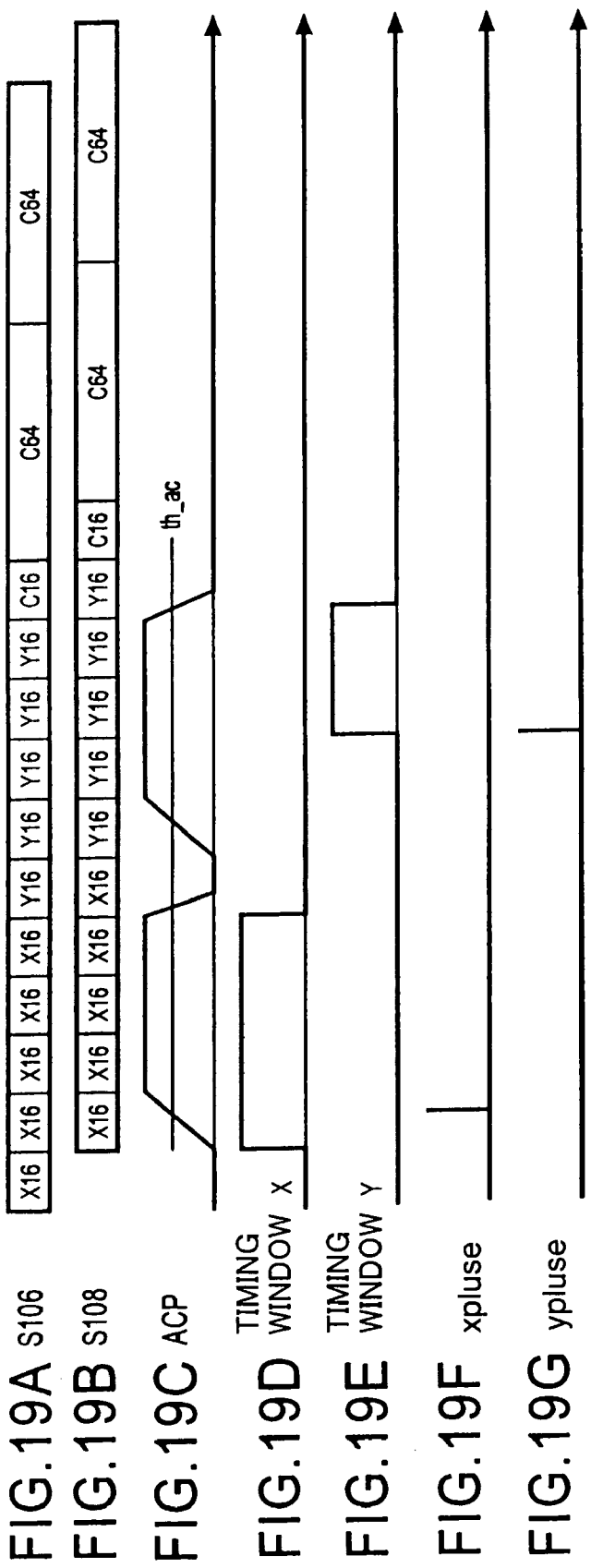

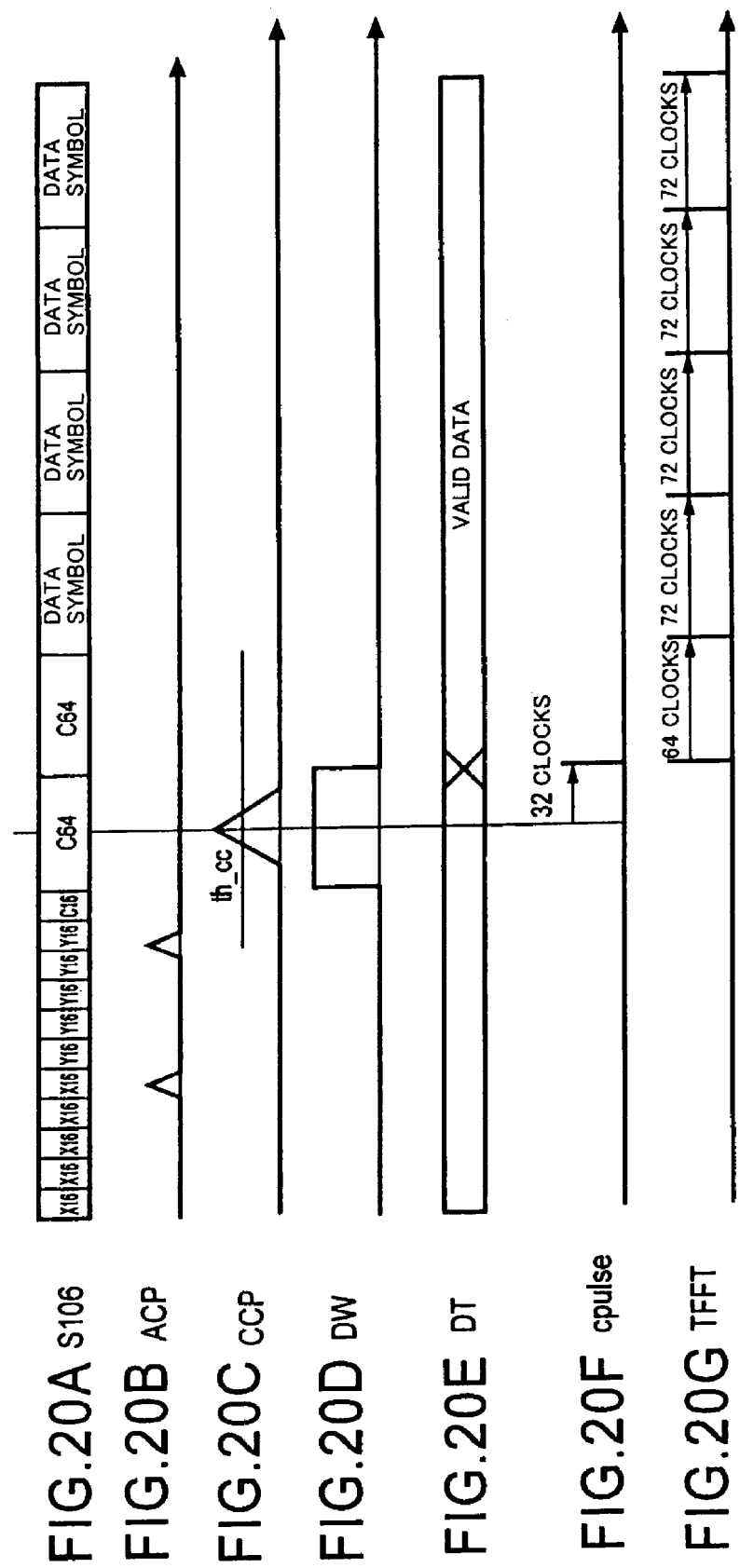

FIG.32

| CASE | ovf | nco[10] | ncoin[10] | ADJ 2 | nco STATUS |
|---|---|---|---|---|---|
| 010 | 0 | 1 | 0 | +1 | ncoin > 0 & nco OVERFLOW |
| 011 | 0 | 1 | 1 | −1 | ncoin < 0 & nco ZERO CROSS |
| 100 | 1 | 0 | 0 | +1 | ncoin > 0 & nco ZERO CROSS |
| 101 | 1 | 0 | 1 | −1 | ncoin < 0 & nco UNDER FLOW |
| DEFAULT | − | − | − | 0 | ACCUMULATING |

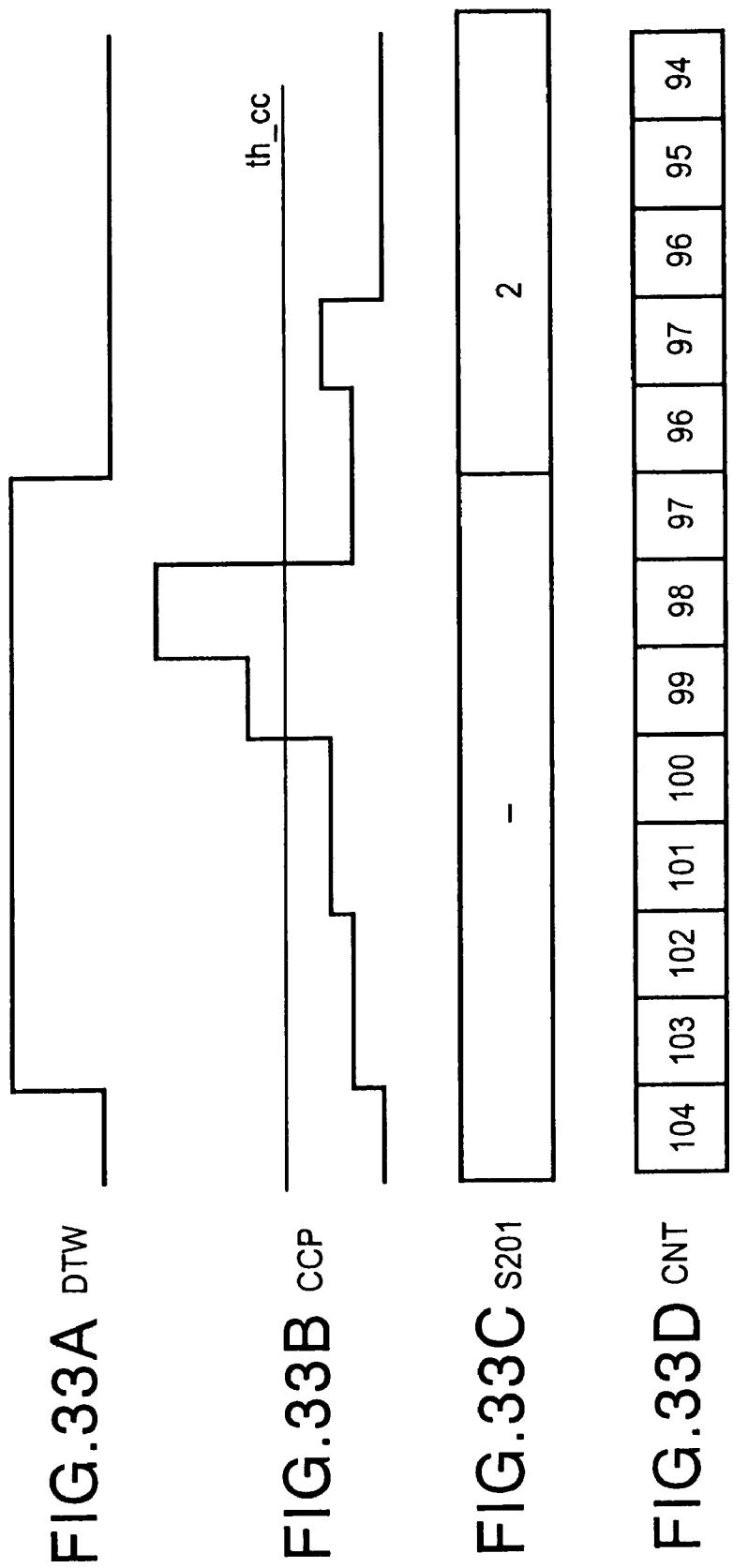

FIG.34A DTW
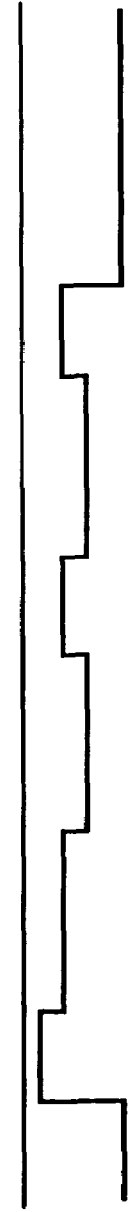
FIG.34B CCP
FIG.34C S201
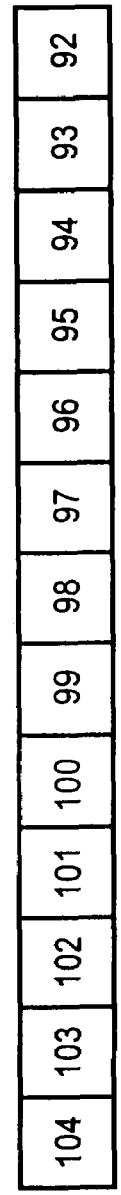
FIG.34D CNT

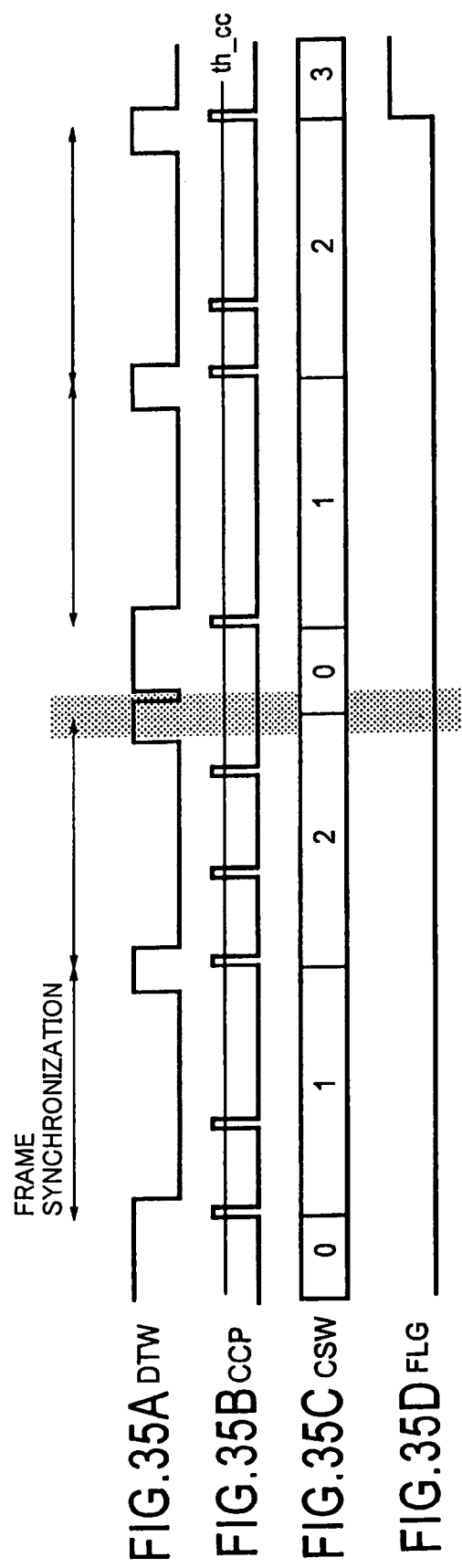
FIG.35A DTW
FIG.35B CCP
FIG.35C CSW
FIG.35D FLG

DEMODULATION TIMING GENERATION CIRCUIT AND DEMODULATION APPARATUS

TECHNICAL FIELD

The present invention relates to a demodulation timing generation circuit and a demodulation apparatus applied to a receiver etc. of a wireless communication system, more particularly relates to a demodulation timing generation circuit and a demodulation apparatus applied to a wireless communication system etc. for receiving, for example, a radio signal which is modulated by an orthogonal frequency division multiplexing (OFDM) modulation method and includes a burst signal including a preamble signal at the header of this modulated packet signal.

BACKGROUND ART

The OFDM modulation method is a modulation method applies an inverse Fourier transform to $2^n$ primary modulated (QPSK, 16ASAM, etc.) transmitted signal symbols to form $2^n$ number of subcarriers orthogonal to each other on the frequency axis.

In a wireless communication system adopting such a OFDM modulation system, a transmitting side subjects transmission data to serial-parallel conversion and performs an inverse fast Fourier transform (IFFT) on the converted data to collectively modulate the plurality of subcarriers orthogonal to each other.

At the transmitting side, a burst signal serving as a synchronization training signal referred to as a preamble signal is added to the header of a modulated signal having a frame structure subjected to such IFFT process and transmitted.

Then, at the receiving side, processes such as automatic gain control (AGC), frequency offset correction, and FFT (Fast Fourier Transform) timing generation are performed using the preamble signal, whereby an FFT operation is performed on the basis of the generated FFT timing.

Note that in a receiver of a wireless communication system, since a reception signal level needs to be adjusted in the dynamic range of an A/D converter, the receiver is equipped with an AGC circuit as the circuit for adjusting the reception signal level to within the dynamic range of the A/D converter.

The AGC circuit synchronizes a timing to within a period of this burst signal, while controls the amplification gain based on the basis of the received level of the burst signal.

Further, in the receiver of the wireless communication system adopting the OFDM demodulation method, the timing for performing the FFT process to a reception symbol needs to be optimized.

This is because offset of the FFT timing leads to inter-symbol interference (ISI) or symbol rotation and therefore leads to the deterioration of the receiving performance.

The FFT timing is set by utilizing the above explained burst signal (training signal) referred to as a preamble added to the header of transmission data.

In the past, the FFT timing was set based on the point a correlation result exceeded a threshold value at the preamble portion using an auto-correlation or cross-correlation circuit.

Note that the auto-correlation is for finding the correlation between repetitive signals included in the preamble portion.

On the other hand, the cross-correlation is for obtaining the correlation between a data sequence known in advance and input data sequence.

Generally, the auto-correlation is not much affected by reflection and fading, but has a weak point in that it shows the correlation of even data and noise other than the preamble.

On the other hand, the cross-correlation does not detect the correlation of noise and unrelated data, however, when there is a large offset in a reception frequency and a reception wave is changed due to reflection and fading, a peak of the correlation tends to become small.

In this manner, since the auto-correlation and cross-correlation are affected by the reflection at a channel, S/N, etc., in the above explained method of using the threshold value for generating the FFT timing, there is encountered a disadvantage that a low threshold value that can be used commonly under various transmission conditions must be set and detecting an accurate timing is difficult.

Further, among the wireless LAN systems using the 5 GHz recently standardized, time division multiple access (TDMA) is adopted in the Wireless 1394 and HiperLAN/2.

In the TDMA wireless communication system, the frame synchronization is the most basic item, however, it has problems such as the following:

(1) In wireless communications, synchronization of every frame cannot always be detected due to the effects of channel conditions such as the occurrence of the above explained fading.

(2) In the above-mentioned system of 5 GHz, to make the system inexpensive, not a high precision crystal oscillator TCXO with temperature compensation, but crystal is used. On account of this, a reference frequency offset between a base station and a mobile station becomes a maximum 40 ppm. This means that the frequency shifts by four clocks in 100,000 clocks. Depending on the frame period, if this offset is not corrected well, the frame synchronization will easily be lost.

(3) If the frame synchronization is lost, more than the usual number of frames will be needed to obtain another synchronization. During that time, a large amount of data transfer will be interrupted.

In a best effort system, transferring the data again will do, however, this becomes a fatal problem if there is a desire to guarantee a certain degree of QoS (Quality of Service).

(4) In the Wireless 1394 system, due to connection with the Wireless 1394, synchronization with a system having a large offset (100 ppm) is necessary, and a frame synchronization system having good compliance is required.

DISCLOSURE OF THE INVENTION

A first object of the present invention is to provide a demodulation timing generation circuit capable of generating correctly and with high precision a timing for demodulating a reception signal even under various kinds of reception conditions and a demodulation apparatus using the same.

A second object of the present invention is to provide a demodulation timing generation circuit high in compliancy and stability capable of stably and continuously maintaining frame synchronization once established and preventing the transmitting/receiving of data from interruption under conditions in which the condition of a channel is unstable, and a demodulation apparatus using the same.

To achieve the above objects, according to a first aspect of the present invention, there is provided a demodulation timing generation circuit for generating a timing signal for starting demodulation of a reception signal having a burst portion serving as a synchronization training signal added to a header portion of a data symbol comprising a burst detector for performing a correlation operation in the burst portion of the reception signal; a peak position detection unit for setting a detection window based on the correlation operation result and detecting a peak of a correlation power and a position of the peak within a period of the detection window; and an output unit for outputting the timing signal after a predetermined time from a detected peak position by the peak position detection unit.

Further, in the first aspect of the present invention, a window width for detecting a peak of the correlation result is variable and is set to a width in accordance with a reception condition.

The peak position detection unit is set a lower limit to a correlation value to be detected and, when the correlation value is less than the lower limit, does not deem a peak has been detected.

Alternatively, in the first aspect of the present invention, the burst detector performs a cross-correlation operation and the peak position detection unit detects a peak of a cross-correlation power and the peak position.

Alternatively, in the first aspect of the present invention, the burst detector performs an auto-correlation operation and cross-correlation operation and the peak position detection unit sets a detection window based on the auto correlation operation result and detects a peak of a cross-correlation power and a position of the peak within a period of the detection window.

In a second aspect of the present invention, there is provided a demodulation timing generation circuit for generating a timing signal for starting demodulation of a reception signal having a burst portion serving as a synchronization training signal added to header portion of a data symbol, comprising a burst detector for performing a correlation operation in the burst portion of the reception signal; a peak position detection unit for setting a detection window based on the correlation operation result and detecting a peak of a correlation power and a position of the peak within a period of the detection window; a counter for counting a symbol section and, if a preset timing data value is counted, outputs a timing signal; and a position timing conversion unit for presetting timing data corresponding to a peak position detected at the peak position detection unit to the counter.

Further, in the second aspect of the present invention, the position timing conversion unit generates timing data based on a relative relationship between a rear edge of a detection window and a peak position and presets the same to the counter.

Alternatively, in the second aspect of the present invention, the peak position detection unit performs peak detection by comparing a previously output maximal value with a size of a present correlation input and stores a timing of a window where the maximal value was obtained to finalize a peak position at an end of the detection window.

Alternatively, in the second aspect of the present invention, the counter cyclically counts one symbol once preset and outputs the timing signal at a constant timing at every symbol.

Alternatively, in the second aspect of the present invention, the counter is a down counter; and the position timing conversion unit changes a load data value of the counter after the counter has counted down to 0.

Alternatively, in the second aspect of the present invention, a window width for detecting a peak of the correlation result is variable and is set to a width in accordance with a reception condition.

Alternatively, in the second aspect of the present invention, the peak position detection unit is set a lower limit to a correlation value to be detected and, when the correlation value is less than the lower limit, does not deem a peak has been detected.

Alternatively, in the second aspect of the present invention, the burst detection unit performs a cross-correlation operation and the peak position detection unit detects a peak of a cross-correlation power and a position of the peak.

Alternatively, in the second aspect of the present invention, the burst detection unit performs an auto-correlation operation and cross-correlation operation and the peak position detection unit sets a detection window based on the auto-correlation operation result and detects a peak of a cross-correlation power and a position of the peak within the detection window period.

In a third aspect of the present invention, there is provided a demodulation timing generation circuit for generating a timing signal for starting demodulation of a reception signal having a burst portion including at least a preamble signal and a reference signal following the preamble signal added to a header portion of the data symbol, comprising a burst detector for performing an auto-correlation operation at a preamble signal portion of a front half portion of the burst portion of the reception signal and performing a cross-correlation operation at a reference signal portion of the rear half thereof; a peak position detection unit for setting a detection window based on the auto-correlation operation result and detecting a peak of the cross-correlation power and a position of the peak within a period of the detection window; and an output unit for outputting a timing signal after a predetermined time from a detected peak position at the peak position detection unit.

Further, in the third aspect of the present invention, a window width for detecting a peak of the cross-correlation result is variable and is set to a width in accordance with a reception condition.

Alternatively, in the third aspect of the present invention, the peak position detection unit is set a lower limit to a correlation value to be detected and, when the correlation value is less than the lower limit, does not deem a peak has been detected.

In a fourth aspect of the present invention, there is provided a demodulation timing generation circuit for generating a timing signal for starting demodulation of a reception signal having a burst portion including at least a preamble signal and a reference signal following the preamble signal added to a header portion of the data symbol, comprising a burst detector for performing an auto-correlation operation at a preamble signal portion of a front half portion of the burst portion of the reception signal and performing a cross-correlation operation at a reference signal portion of the rear half thereof; a peak position detection unit for setting a detection window based on the auto-correlation operation result and detecting a peak of the cross-correlation power and a position of the peak within a period of the detection window; a counter for counting the symbol section and, if a preset timing data value is counted, outputting a timing signal; and a position timing conversion unit for presetting timing data corresponding to a peak position detected at the peak position detection unit to the counter.

Further, in the fourth aspect of the present invention, the position timing conversion unit generates timing data based on a relative relationship between a rear edge of a detection window and a peak position and presets the same to the counter.

Alternatively, in the fourth aspect of the present invention, the peak position detection unit performs peak detection by comparing a previously output maximal value with a size of a present input and stores a timing of the detection window where the maximal value was obtained to finalize a peak position at the end of the detection window.

Alternatively, in the fourth aspect of the present invention, the counter cyclically counts one symbol once preset and outputs the timing signal at a constant timing at every symbol.

Alternatively, in the fourth aspect of the present invention, the counter is a down counter and the position timing conversion unit changes a load data value of the counter after the counter has counted down to 0.

Alternatively, in the fourth aspect of the present invention, a window width for detecting a peak of the cross-correlation result is variable and is set to a width in accordance with a reception condition.

Alternatively, in the fourth aspect of the present invention, the peak position detection unit is set a lower limit to a cross-correlation value to be detected and, when the correlation value is less than the lower limit, does not deem a peak has been detected.

In a fifth aspect of the present invention, there is provided a demodulation timing generation circuit for generating a timing signal for starting demodulation of a reception signal having a frame synchronization signal in which a burst portion serving as a synchronization training signal is added to a header portion of a data symbol, comprising a burst detector for performing a correlation operation in the burst portion of the frame synchronization signal; a peak detection circuit for performing peak detection of a correlation power by the burst detection unit for peaks in a detection window set centered around an expected timing and exceeding a detection threshold value and outputting a signal indicating an offset between the expected timing and a peak detection position; a frame period counter for counting a frame period by a reference clock, which counter uses a set count as an operation period, generates a window timing of a detection window for instructing the peak detection circuit based on the operation period, and instructs to output the timing signal at a timing in accordance with the expected timing based on the set count; an averaging circuit for averaging an offset between a result of peak detection of frame synchronization by the peak detection circuit and the expected timing of synchronization detection by the frame period counter and outputting a result thereof as a correction value; and a correction value setting circuit for setting a period corrected by a correction value by the averaging circuit as the count value to the frame period counter.

Further, in the fifth aspect of the present invention, when the peak detection circuit performs peak detection in the detection window and a peak value thereof does not exceed a detection threshold value, it judges that correlation is not detected and does not output a signal indicating an offset to the averaging circuit.

Alternatively, in the fifth aspect of the present invention, in the case of first frame synchronization is pulled-in, the peak detection circuit detects the peak of correlation in a state where a detection window is opened all the time and deems synchronization was detected at the point a peak value first exceeds a threshold value.

Alternatively, in the fifth aspect of the present invention, the circuit further comprises a synchronization judgment circuit for judging if synchronization was detected or not upon receiving an output signal of a peak detection circuit and, in the case synchronization was detected, sets a count value of the expected timing of the synchronization detection of the frame period counter by the output signal of the peak detection circuit.

Alternatively, in the fifth aspect of the present invention, the averaging circuit includes an integrating circuit, uses a certain range of higher bits (whole number part) in an output as a first correction value, accumulates lower bits (decimal part) obtained by subtracting the higher bits, including the sign, at every frame by an accumulating circuit, adds a second correction value to the first correction value corresponding to a carry period thereof, and outputs the result as the correction value to the correction value setting circuit.

Preferably, the burst detector performs a cross-correlation operation at a reference signal portion of a rear half portion of the burst portion of the reception signal.

In a sixth aspect of the present invention, there is provided a demodulation apparatus for demodulating a reception signal having a burst portion serving as a synchronization training signal added to a header portion of a data symbol, comprising a burst detector for performing a correlation operation in the burst portion of the reception signal; a peak position detection unit for setting a detection window based on the correlation operation result and detecting a peak of a correlation power and a position of the peak within a period of the detection window; an output unit for outputting a timing signal after a predetermined time from a detected peak position by the peak position detection unit; and a demodulation unit for performing a Fourier transform on the reception signal to demodulate the same upon receiving the timing signal output from the output unit.

In a seventh aspect of the present invention, there is provided a demodulation apparatus for demodulating a reception signal having a burst portion serving as a synchronization training signal added to a header portion of a data symbol, comprising a burst detector for performing a correlation operation in the burst portion of the reception signal; a peak position detection unit for setting a detection window based on the correlation operation result and detecting a peak of a correlation power and a position of the peak within a period of the detection window; a counter for counting a symbol section and, if counting a preset timing data value, outputs a timing signal; a position timing conversion unit for presetting timing data corresponding to a peak position detected at the peak position detection unit to the counter; and a demodulation unit for performing a Fourier transform on the reception signal to demodulate the same upon receiving the timing signal output from the counter.

In an eighth aspect of the present invention, there is provided a demodulation apparatus for demodulating a reception signal having a burst portion including at least a preamble signal and a reference signal following the preamble signal added to a header portion of a data symbol, comprising a burst detector for performing an auto-correlation operation at a preamble signal portion of a front half portion of the burst portion of the reception signal and performing a cross-correlation operation at a reference signal portion of the rear half thereof; a peak position detection unit for setting a detection window based on the auto-correlation operation result and detecting a peak of the cross-correlation power and a position of the peak within a period of the detection window; an output unit for outputting a timing signal after a predetermined time from a detected peak position at the peak position detection unit; and a demodulation unit for performing a Fourier transform on the reception signal to demodulate the same upon receiving the timing signal output from the output unit.

In a ninth aspect of the present invention, there is provided a demodulation apparatus for demodulating a reception signal having a burst portion including at least a preamble signal and a reference signal following the preamble signal added to a header portion of a data symbol, comprising a burst detector for performing an auto-correlation operation at a preamble signal portion of affront half portion of the burst portion of the reception signal and performing a cross-correlation operation at a reference signal portion of the rear half thereof; a peak position detection unit for setting a detection window based on the auto-correlation operation result and detecting a peak of the cross-correlation power and a position of the peak within a period of the detection window; a counter for counting a symbol section and, if a preset timing data value is counted, outputting a timing signal; a position timing conversion unit for presetting timing data corresponding to a peak position detected by the peak position detection unit to the counter; and a demodulation unit for performing a Fourier transform on the reception signal and demodulating the same upon receiving the timing signal output from the counter.

Further, in the present invention, the apparatus further comprises an automatic gain control amplifier for amplifying an input reception signal level with a gain in accordance with a gain control signal and outputting the result to the burst detector and the demodulation unit, the burst detector performs burst detection based on a correlation operation of the amplified reception signal and outputs a burst synchronization detection signal; and the apparatus further comprises an amplification gain controller outputting the gain control signal to the automatic gain control amplifier so that amplification is performed with a gain in accordance with a reception signal power value upon receiving the burst synchronization detection signal by the burst detection unit.

Further, in the present invention, the reception signal is modulated based on an orthogonal frequency division multiplexing method.

In a 10th aspect of the present invention, there is provided a demodulation apparatus for generating a timing signal for starting demodulation of a reception signal having a frame synchronization signal in which a burst portion serving as a synchronization training signal is added to a header portion of a data symbol, comprising a burst detector for performing a correlation operation in the burst portion of the frame synchronization signal; a peak detection circuit for performing peak detection of a correlation power by the burst detection unit for peaks only in a detection window set centered around an expected timing and exceeding a detection threshold value and outputting a signal indicating an offset between the expected timing and a peak detection position; a frame period counter for counting a frame period by a reference clock, which counter uses a set count as an operation period and generates a window timing of a detection window for instructing the peak detection circuit based on the operation period, and instructs so that the timing signal is output at a timing in accordance with the expected timing based on the set count; an averaging circuit for averaging an offset between a result of peak detection of frame synchronization by the peak detection circuit and the expected timing of a synchronization detection by the frame period counter and outputting a result thereof as a correction value; a correction value setting circuit for setting a period corrected by a correction value by the averaging circuit as the count value to the frame period counter; and a demodulation unit for performing a Fourier transform on the reception signal and demodulating the same upon receiving a timing signal in accordance with an instruction output from the frame period counter.

According to the present invention, the gain control signal is output to the automatic gain control amplifier by the amplification gain controller, whereby an amplification gain of the automatic gain control amplifier is set to a predetermined gain.

Under this condition, the state of waiting for input of a reception signal is entered.

Under such a condition, first a reception signal is input into the automatic gain control amplifier Then, the burst detector detects a burst signal of a period set by a communication system. First, it detects the preamble signal on the basis of the auto-correlation operation, generates a burst synchronization detection signal indicating that detection was performed, and outputs it to the amplification gain controller.

The amplification gain controller receives the burst synchronization detection signal by the burst detector, calculates a gain based on a reception signal power value, and sets the gain control signal to the calculated value.

The gain control signal is supplied to the automatic gain control amplifier. The automatic gain control amplifier receives the gain control signal and sets the gain to a second gain of the calculated value.

The automatic gain control amplifier amplifies, for example, a preamble signal and a reference section of the reception signal with a gain corresponding to a reception signal level.

The burst detector calculates the correlation (auto-correlation and cross-correlation) of the amplified reception signal. At this time, it obtains the cross-correlation by a reference signal of the rear half part of the burst signal.

Further, the burst detector generates a detection window for performing the peak detection of the peak position detector on the basis of the auto-correlation result and sets it in the peak position detector.

Then, it supplies a cross-correlation power of the cross-correlation result to the peak position detector.

The peak position detector finds a maximal value of the cross-correlation power value of the cross-correlation result inside the detection window and a position at that time.

Note, here, only peak information indicating where the peak inside the detection window was located can be obtained at the end of the window.

Next, the position timing conversion unit converts the position information obtained by the peak position detector into a timing on the time axis and presets data enabling a counter for counting one symbol to generate (output) an optimal timing signal in the counter on the basis of the converted data.

The once preset counter continues to cyclically count the period of one symbol and successively outputs the timing signal at a constant timing at every symbol.

Then, at the time the preset data is, for example, counted down, it outputs an FFT timing signal to the demodulator.

The demodulator performs a fast Fourier transform on the signal in synchronization with the timing signal to demodulate the OFDM signal.

Further, according to the present invention, for example, when frame synchronization detection is obtained by using cross-correlation of a synchronization pattern, a result of peak detection of the correlation value is ignored when the correlation value is less than a fixed level, while if it is a correlation value greater than the constant level, the timing of the frame period counter is directly reset using the timing thereof and averaged at the same time, whereby the frame period counter is corrected.

Synchronization high in compliancy and stability can thus be obtained.

BRIEF DESCRIPTION OF THE DRAWINGS

FIG. 8A to FIG. 8D are views of examples regarding the timing for loading data into an FFT.

FIG. 9 is a circuit diagram of the concrete configuration of an automatic gain control amplification unit of FIG. 1.

FIG. 16 is a circuit diagram of an example of the configuration of a cross-correlation circuit of FIG. 14.

FIG. 17A to FIG. 17D are views showing a relationship between a cross-correlation peak position and load data to the counter.

FIG. 18A to FIG. 18D are views showing an operation timing of a timing counter (symbol counter).

FIG. 19A to FIG. 19G are views showing timing charts from an auto-correlation processing of the burst detector to when synchronization detection signals xpulse and ypulse are output.

FIG. 20A to FIG. 20G are views showing timing charts of from a cross-correlation processing of the burst detection to when synchronization detection signal cpulse and an FFT timing signal TFFT are output.

FIG. 32 is a view of the state of overflow detection of the numerical control oscillator of FIG. 30.

FIG. 33A to FIG. 33D are time charts of an example of an operation timing of frame synchronization according to the present second embodiment.

FIG. 34A to FIG. 34D are time charts showing an example of the operation timing of frame synchronization according to the present second embodiment.

FIG. 35A to FIG. 35D are timing charts of an example of the operation timing at the time of initial pull-in of frame synchronization according to the present second embodiment.

BEST MODE FOR CARRYING OUT THE INVENTION

Next, an explanation will be given of preferred embodiments of the present invention with reference to the drawings.

First Embodiment

Figure 1:
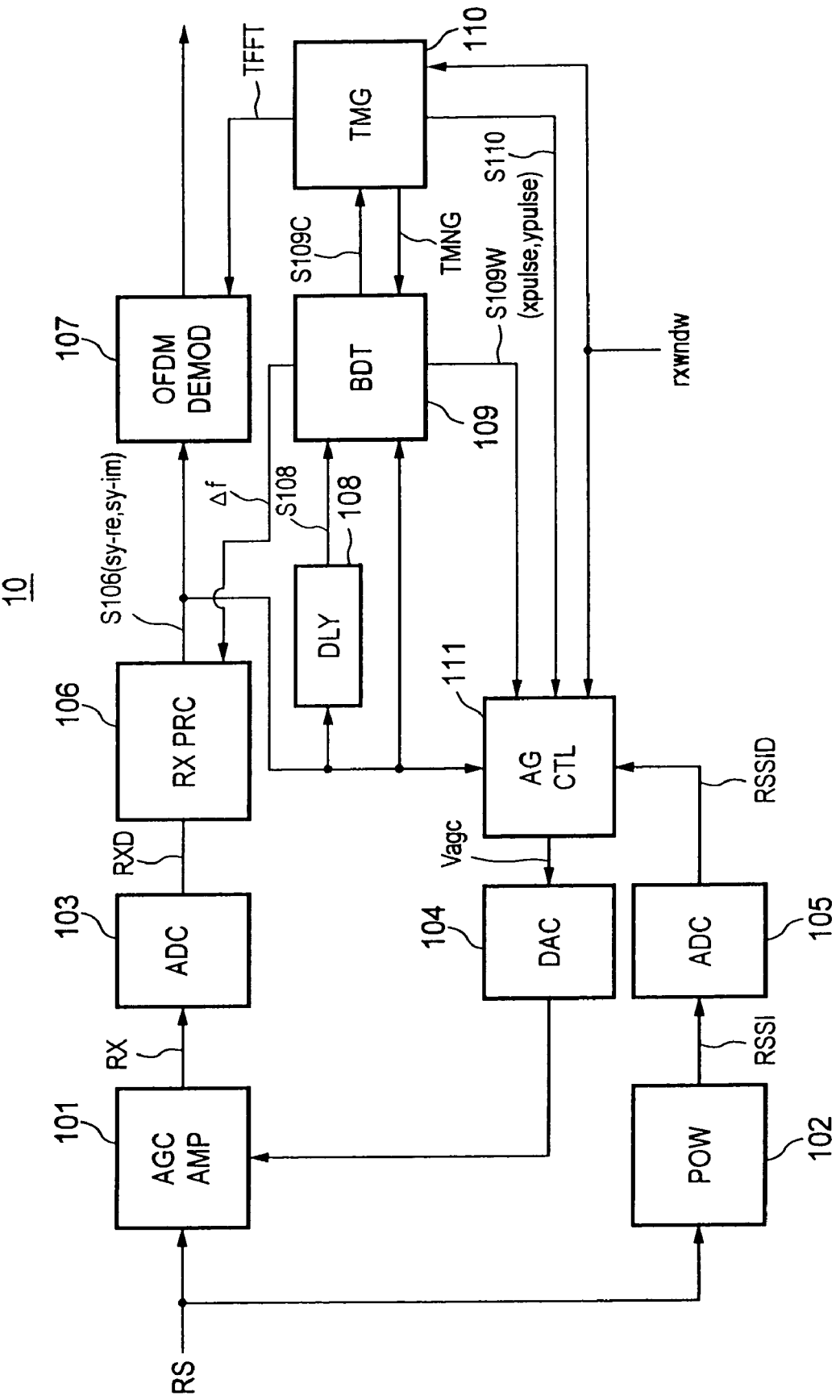
FIG. 1 is a block diagram of the configuration of a first embodiment of a burst synchronization demodulation apparatus to which an FFT timing generation circuit according to the present invention is applied.

FIG. 1 is a block diagram of the configuration of a first embodiment of a burst synchronization demodulation apparatus to which an FFT timing generation circuit according to the present invention is applied.

The burst synchronization demodulation apparatus 10, as shown in FIG. 1, comprises as its main components an automatic gain control amplifier (AGCAMP) 101, a reception signal power monitor (POW) 102, an analog-to-digital (A/D) converter (ADC) 103, a digital-to-analog (D/A) converter (DAC) 104, an A/D converter (ADC) 105, a reception signal processing unit (RXPRC) 106, an OFDM demodulator (DEMOD) 107, a delay unit (DLY) 108, a burst detector (BDT) 109, a timing controller (TMG) 110, and an amplification gain controller (AGCTL) 111.

Below, an outline of the optimization of an automatic gain control system, a transmission (reception) signal, and an FFT timing of a burst synchronization communication system adopted in the present embodiment and the specific configurations and functions of each of the components of the burst synchronization demodulation apparatus 10 of FIG. 1 will be explained in order.

First, an explanation will be given of an automatic gain control system of a burst synchronization demodulation apparatus of a 5 GHz band wireless LAN system.

The OFDM modulation method has been adopted in a 5 GHz band wireless LAN system in order to realize excellent communication performance over a wide band.

An OFDM modulation method is large in strength against ghosts and multi-path, but in contrast is weak in strength against non-linearity of a circuit.

For this reason, when distortion of A/D converter etc. occurs, a remarkable deterioration of the reception signal quality is induced.

For this purpose, in a 5 GHz band wireless LAN system, it is necessary to insert a burst signal of 10 to 20 microseconds referred to as a "preamble signal" into the header of a modulation signal having a frame structure, taking timing synchronization in this selection, on the one hand and to perform level aquisition of a voltage amplitude of a signal input to the A/D converter 103 within a signal tolerance range where distortion does not occur.

Further, the several microseconds of the rear half of the preamble signal include a reference signal for monitoring the frequency characteristic of a channel and correcting a data signal (actual communication data) following the preamble signal. In the reference signal and the data signal, fluctuation of the level of the digital signal output from the A/D converter 103 is not allowed. The gain of the automatic gain control amplifier 101 needs to be maintained constant.

Therefore, in a 5 GHz band wireless LAN system, a high-speed and high-performance automatic gain amplification method for performing level acquisition within a signal tolerance range where distortion does not occur in a time of 10 microseconds become necessary.

In the present embodiment, as will be explained later, in order to realize high-speed and high-performance level acquisition to be performed in the preamble section, a three step level acquisition is carried out.

As the 5 GHz band wireless LAN systems, there are the following three typical systems:

(1) IEEE 802.11a,
(2) BRAN, and
(3) Wireless 1394.

Figure 2:
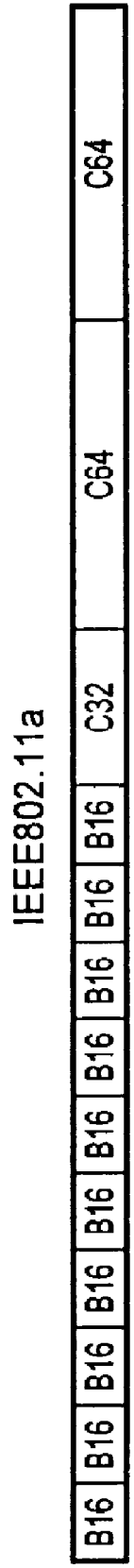
FIG. 2 is a view showing a burst signal portion including a representative preamble signal of an IEEE802.11a system.
Figure 3:
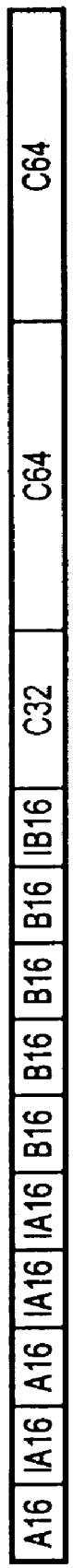
FIG. 3 is a view showing a burst signal portion including a representative preamble signal showing a BRAN system.
Figure 4:
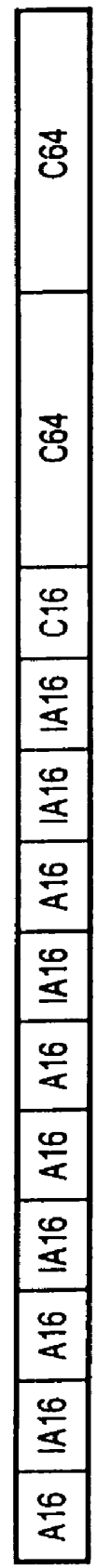
FIG. 4 is a view showing a burst signal portion including a representative preamble signal of a Wireless 1394 system.

FIG. 2 is a view showing representative preamble signal of the IEEE802.11a system, FIG. 3 is a view showing a representative preamble signal of the BRAN system, and FIG. 4 is a view showing a representative preamble signal of the Wireless 1394.

In the preamble signal of each of the systems shown in FIG. 2 to FIG. 4, A16, B16, and so forth indicate pattern identification and a burst period, while IA16 indicates the pattern of A16 phase inverted.

Further, C64 indicates a reference signal, while C16 and C32 indicate guard interval portions.

In the IEEE802.11a, the pattern B16 is repeated 10 times. As opposed to this, in the BRAN, the first five periods are different (A16, IA16, A16, IA16, IA16).

Further, in the Wireless 1394 system, all of the 10 periods are different patterns. Specifically, they become patterns of A16, IA16, A16, IA16, A16, A16, IA16, A16, IA16, IA16.

Further, in the Wireless 1394 system a synchronous transfer mode is supported, so a continuous signal such as a video signal can be communicated.

However, when a data signal extending over a long period is communicated, the transmission characteristic changes from the transmission characteristic at the time of the reference signal in the preamble signal at the header of the reception signal under a multi-path environment and the reception performance ends up deteriorating.

Figure 5:
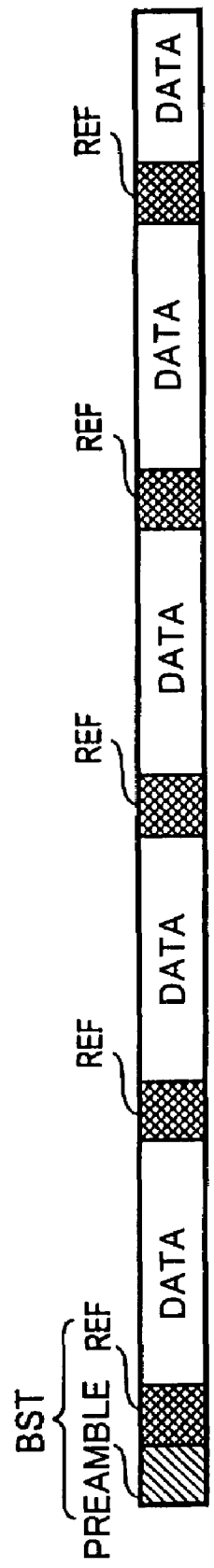
FIG. 5 is a view showing a signal formal in which a reference signal REF is inserted in a data signal section of a constant period or more in the Wireless 1394 system.

For this reason, the data signal section of the constant period or more, as shown in FIG. 5, has a reference signal REF is inserted in it. Due to this, the transmission characteristic is remeasured again for every reference signal, and deterioration of the reception performance is prevented.

Figure 6:
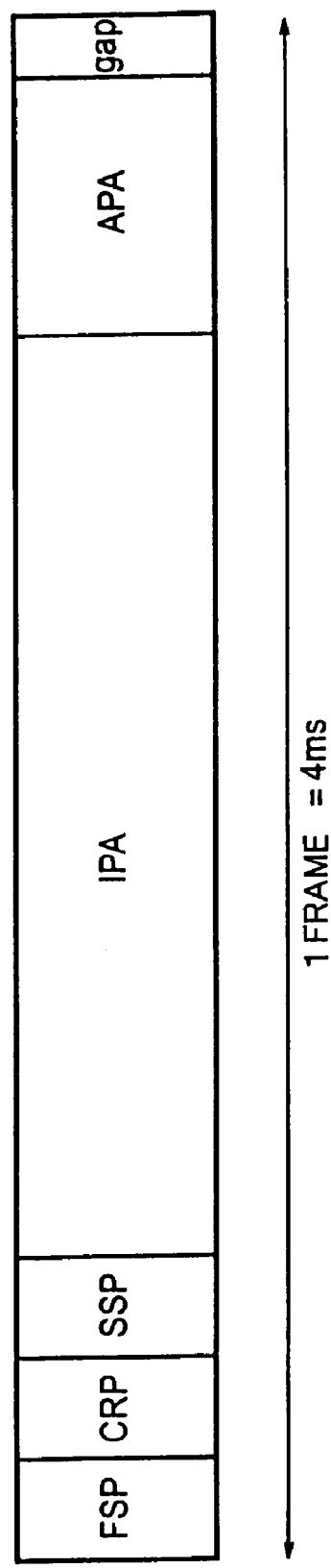
FIG. 6 is a view showing a frame structure in the Wireless 1394 system.

Further, FIG. 6 is a view showing the frame structure in the Wireless 1394 system.

The Wireless 1394 system defines 4 milliseconds as 1 frame on the basis of a base station or a hub station. As with the Wireless 1394 system, many TDMA systems adopt such the frame structure. As shown in FIG. 6, the frame is divided into several areas for use.

Specifically, one frame, as shown in FIG. 6, is divided from the header side of the frame into the following areas: FSP (Frame Start Packet); SRP (Cycle Report Packet); SSP (Station Sync Packet); IPC (Isochronous Packet Area); APC (Asynchronous Packet Area); and gap.

The preamble signal is placed in the frame start packet FSP of the header.

Such a burst signal requires optimization of the reception level (AGC), correction of the reception frequency offset, and detection of synchronization in a short time.

In the present invention, as will be explained later, at the time of reception start (time of start of burst detection), the gain level of the automatic gain control amplifier 101 is maximized and a standby state entered.

When it detects a signal, it measures the size (reception signal power) of a constant period of the input signal and adjusts the gain level of the previous automatic gain control amplifier 101 on the basis of the result.

Next, the reception frequency offset is detected and corrected. The frequency offset is detected using auto-correlation. Use is made of the fact that the output of a correlator corresponds to phase rotation in a repeating period.

Detection of synchronization is carried out by using auto-correlation or cross-correlation. FFT timing for an OFDM data symbol is determined based on the detected synchronization timing.

Figure 7A:
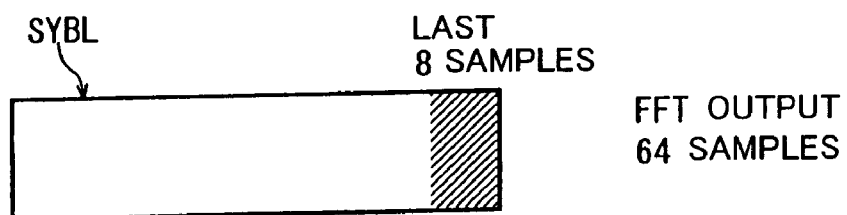
FIG. 7A and FIG. 7B are views for explaining cyclic extension for adding in front of a data portion a guard interval for repeating the last portion of the data in an OFDM data symbol.
Figure 7B:
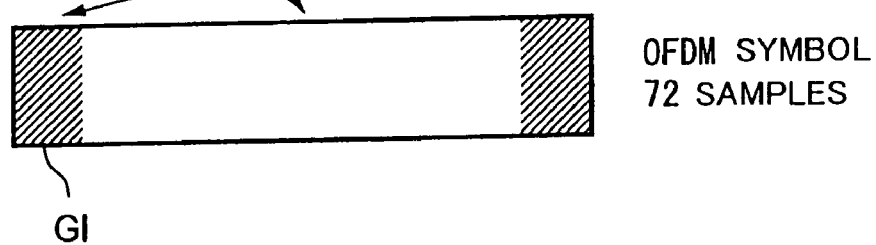

With an OFDM data symbol SYBL, as shown in FIG. 7A and 7B, cyclic extension method is used to add in front of the data portion a guard interval GI for repeating the last portion of the data. This is to keep inter-symbol interference caused by a multi-path or the like to a minimum.

In this example, a 4 μs guard interval is added to a data portion of 3.2 μs, whereby the length of one symbol becomes 3.6 μs.

FIG. 8A to FIG. 8D are views showing examples regarding the timing of loading data into an FFT of such a case.

The example of FIG. 8B shows a case wherein the timing of loading data to the FFT is too early. In this example, when there is a delay wave due to a multi-path, the data of the previous symbol covers (overlaps) the FFT range, thus deterioration due to inter-symbol interference may occur.

On the other hand, the example of FIG. 8C shows a case wherein the timing of loading data to the FFT is too slow. As in this example, if the latter part of the symbol is set to be loaded into the FFT, if the FFT timing shifts to the latter part due to some kind of factor, this again leads to deterioration cause by inter-symbol interference.

Therefore, the timing is normally set to the one shown in FIG. 8D.

As can be understood from the above, optimally setting the FFT timing is important in the receiver of a wireless communication system using OFDM.

The method of setting the FFT timing according to the present invention will be outlined below.

First, a front half part of the preamble is detected for AGC and correction of the frequency offset. Here, a detection window for obtaining cross-correlation at the rear half part is generated.

The result of auto-correlation detection of the front half part of the preamble, for example, can be used for setting the window. Since sufficient synchronization timing cannot be acquired by auto-correlation detection, this window is set with a sufficient margin.

A peak search of the cross-correlation output is performed in this window. The peak search is performed by comparing the maximal value output up to now with the size of the present input.

By storing the timing of the window from which the maximal value was obtained, a peak position is determined at the end of the window.

Since the peak of the cross-correlation is obtained at the time the input signal and an expectation value signal match on the time axis, generating the FFT timing on the basis thereof enables optimal operation.

In this method, however, only peak information indicating where the peak in the window was located can be obtained at the end of the window.

Therefore, the peak information is converted into a timing on the time axis by a method such as the following.

First, a counter for counting one symbol is prepared. This counter is made one for generating an FFT timing signal TFFT when it reaches a certain value.

Since the relationship between the peak position of the cross-correlation and the optimal FFT timing is known in advance, if the relative relationship between the rear end (edge) of the detection window and the peak position is known, the value of the one-symbol counter can be optimally preset at the rear edge of the detection window.

The once preset counter continues to count the period of one symbol cyclically and successively outputs the FFT timing at a constant timing at every symbol.

The components of the demodulation apparatus for demodulating the reception signal when a burst signal portion including a signal of 10 to 20 μs referred to as a preamble signal is inserted in the header of the modulated signal at an optimal FFT timing in the above way have the following configurations and functions:

The automatic gain control amplifier 101 automatically controls the gain of the reception signal RS received at a not shown antenna based on the level of a gain control signal Vagc by the amplification gain controller 111 supplied through the DAC 110 and outputs the result to the A/D converter 103 as a signal RX having a desired level. Note that the automatic gain control amplifier 101 is controlled between a case of automatic gain control by the gain control signal Vagc from the amplification gain controller 211 and a case of fixing the control gain.

FIG. 9 is a circuit diagram showing the concrete configuration of the automatic gain control amplifier 101.

The automatic gain control amplifier 101, as shown in FIG. 9, comprises a gain control amplifier (GCA) 1011, a local oscillator 1012, a multiplier 1013, an amplifier 1014, and band pass filter (BPF) 1015 having a bandwidth of several tens of MHz.

Among these components, the local oscillator 1012 and the multiplier 1013 comprise a frequency conversion circuit. The local oscillator 1012 outputs, for example, a signal $e(j2\pi f_{cw}t)$ of a carrier frequency $f_{cw}$ to the multiplier 1013. Note, the ( ) indicates a power of e.

In the automatic gain control amplifier 101 of FIG. 9, the gain control amplifier 1011 amplifies the reception signal (IF input signal) RS with a gain determined by the gain control signal Vagc, the amplified signal is converted in frequency by the frequency conversion circuit formed of the local oscillator 1012 and the multiplier 1013, then the BPF 1015 restricts the band to obtain an output signal (IF output) RX.

Figure 10:
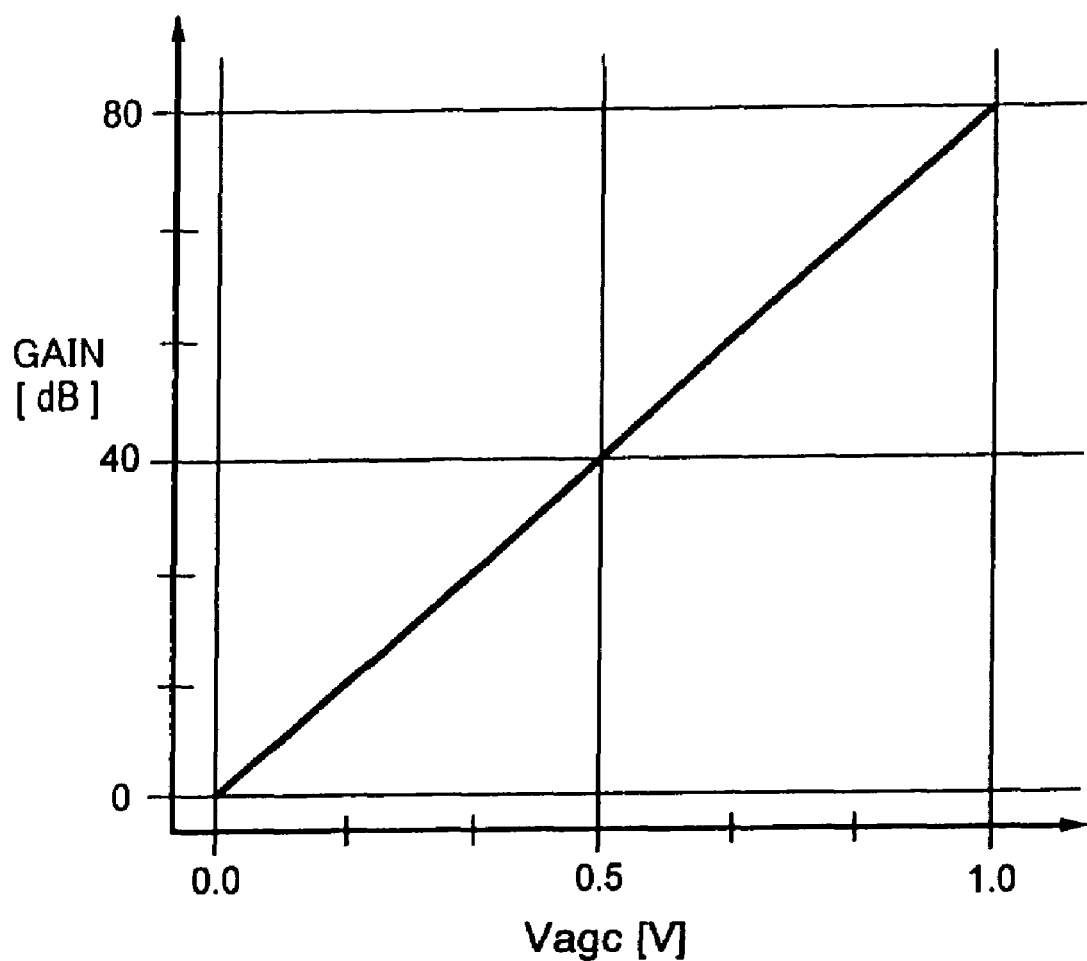
FIG. 10 is a view showing an example of a gain control characteristic of a gain control amplifier of FIG. 9.

Further, FIG. 10 is a view showing a gain control characteristic of the gain control amplifier 1011 of FIG. 9.

In FIG. 10, the abscissa indicates the gain control signal Vagc, and the ordinate indicates the gain.

In this example, as shown in FIG. 10, the gain control amplifier 1011 linearly changes the gain from 0 to 80 dB within a range where the gain control signal Vagc is 0V to 1V.

Namely, in this example, the control gain range is 80 dB.

The reception signal power monitor (POW) 102 includes a peak detection circuit (Peak Det) 1021 as a peak value detection circuit as shown in FIG. 9, measures a peak voltage of the reception signal RS, converts it to a field strength signal RSSI of a voltage signal taking a value in accordance with the input reception signal level, and outputs the same to the A/D converter 105.

Here, in order to deal with abrupt signal changes, the monitor detects, not the average value, but the peak value. Note that, a reset signal is given at the time of start of burst detection to reset the peak detection circuit (Peak Det) 1021 so that maximum peak value after that can be monitored.

Figure 11:
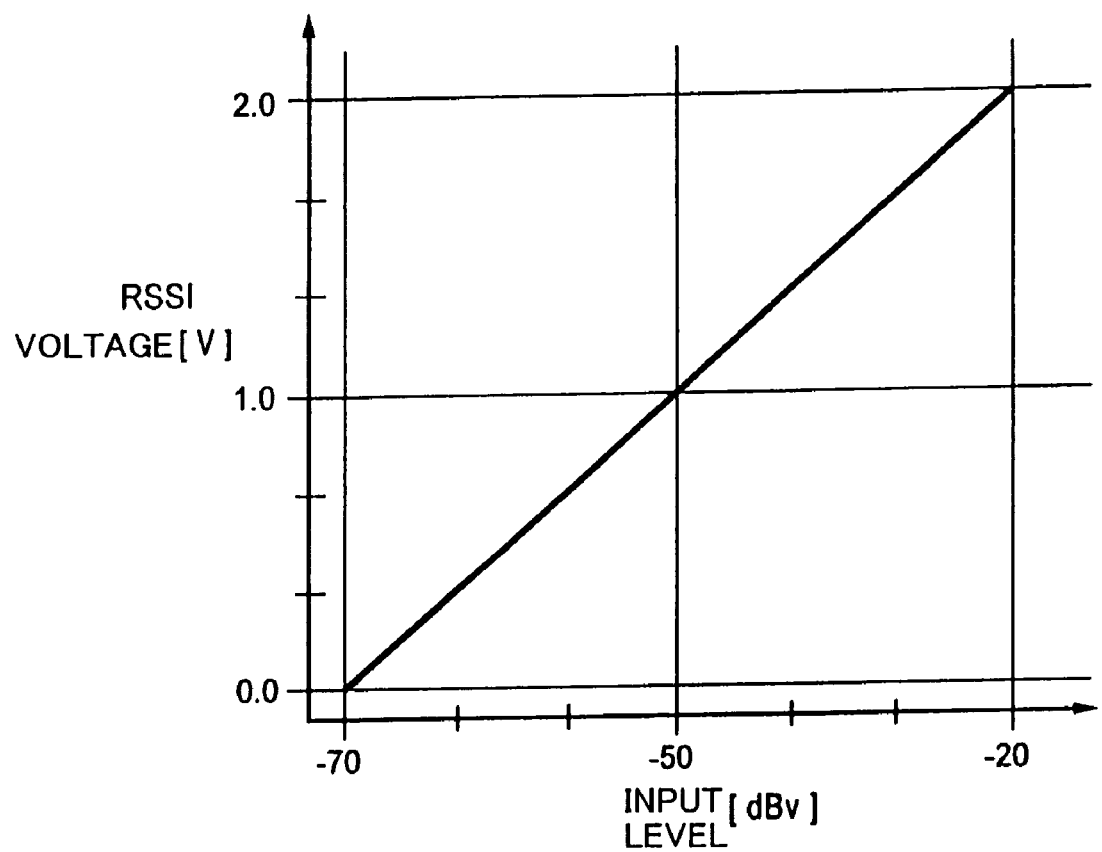
FIG. 11 is a view showing an output characteristic of a reception signal power monitor for an input level of a reception signal.

FIG. 11 is a view showing the output characteristic of the reception signal power monitor 102 with respect to an input level of a reception signal.

In FIG. 11, the abscissa indicates the input level, and the ordinate indicates the voltage of the field strength signal RSSI.

In this example, as shown in FIG. 11, the voltage of the field strength signal RSSI linearly changes from 0V to 2V within the range where the input level is of −70 dBv to −20 dBv.

The A/D converter 103 converts the analog reception signal RX output from the automatic gain control amplifier 101 into a digital signal and outputs the same as a digital reception signal RXD to the reception signal processing unit 106.

The D/A converter 104 converts the gain control signal Vagc generated at the amplification gain controller 111 from a digital signal to an analog signal and outputs the same to the automatic gain control amplifier 101.

The A/D converter 105 converts the field strength signal RSSI output from the reception signal power monitor 102 from an analog signal to a digital signal and outputs the same to the amplification gain control unit 111.

The reception signal processing unit 106 converts the digital reception signal RXD into baseband signals bb_re (real portion) and bb_im (imaginary portion), converts the sampling frequency of the baseband signal to a low frequency (performs down sampling), performs complex multiplication based on an error detection frequency Δf by the burst detector 109 to correct a frequency offset, generates a signal S106 (sy_re and sy_im), and outputs the same to the OFDM demodulator 107, the delay unit 108, the burst detector 109, and the amplification gain controller (AGCTL) 111.

Figure 12:
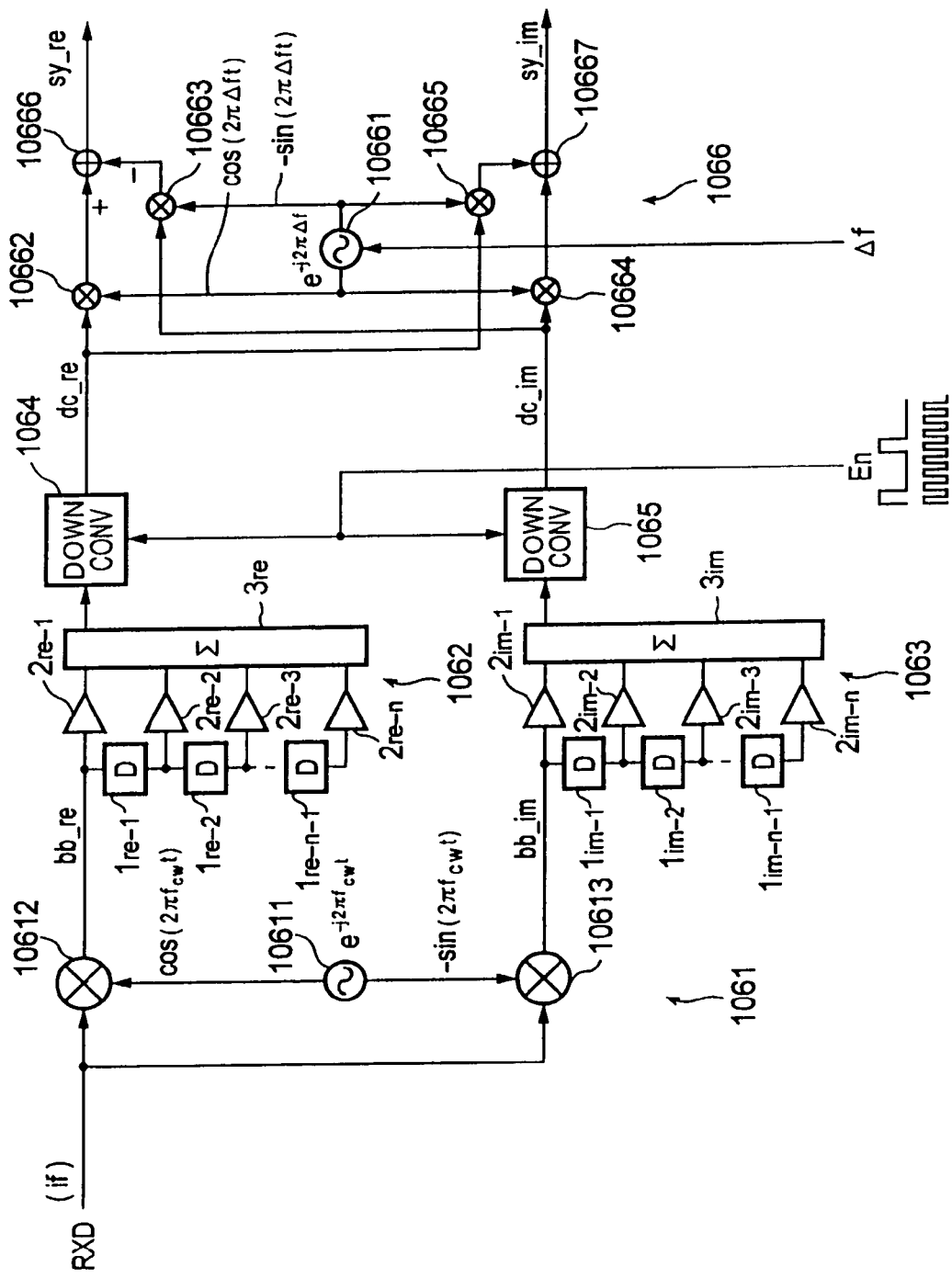
FIG. 12 is a circuit diagram of an example of the concrete configuration of a reception signal processing unit of FIG. 1.

FIG. 12 is a circuit diagram showing an example of the concrete configuration of the reception signal processing unit 106 of FIG. 1.

The reception signal processing unit 106, as shown in FIG. 12, is comprised of a baseband conversion circuit 1016, digital low pass filters (LPF) 1062 and 1063, down convert circuits 1064 and 1065, and a frequency offset correction circuit 1066.

The baseband conversion circuit 1061 is comprised of a local oscillator 10611 and multipliers 10612 and 10613.

The baseband conversion circuit 1061 multiplies the reception signal RXD (if) by a carrier frequency $f_{cw}$ at the multipliers 10612 and 10613 to convert the input reception signal RXD (if) to the baseband signals bb_re and bb_im as shown in Equation (1) and outputs results to the LPFs 1062 and 1063:

$$bb\_re = if \times \cos(2\pi f_{cw} t)$$
$$bb\_im = if \times \sin(2\pi f_{cw} t) \quad (1)$$

The LPFs 1062 and 1063 have, for example, linear phase FIR (Finite Impulse Response) transversal type circuit configurations.

The LPF 1062 is comprised of (n−1) number of delay devices 1*re*-1 to 1*re*-n−1 cascade connected with the input line of the baseband signal bb_re and configuring a shift register, n number of multipliers 2*re*-1 to 2*re*-n for multiplying the input baseband signal bb_re and the output signals of the delay units 1*re*-1 to 1*re*-n−1 with filter coefficients h (0) to h (n−1), and an adder 3*re* for adding the output the signals of the n number of multipliers 2*re*-1 to 2*re*-n and outputting the result to the down convert circuit 1064.

The LPF 1063 is comprised of (n−1) number of delay devices 1*im*-1 to 1*im*-n−1 cascade connected with the an input line of the baseband signal configuring a shift register, n number of multipliers 2*im*-1 to 2*im*-n for multiplying the input baseband signal bb_im and the output signals of the delay units 1*im*-1 to 1*im*-n−1 with the filter coefficients h (0) to h (n−1), and an adder 3*im* for adding output signals of the n number of multipliers 2*im*-1 to 2*im*-n and outputting the result to the down convert circuit 1065.

The sampling frequencies of the baseband signals bb_re and bb_im are converted to signals dc_re, dc_im of, for example, 100 MHz to 25 MHz by the LPFs 1062 and 1063 and the down convert circuits 1064 and 1065.

At this time, the LPFs 1062 and 1063 restrict the bands of the baseband signals bb_re and bb_im and prevent adjacent carriers from being aliased.

Further, the timings of the down sampling in the down convert circuits 1064 and 1065 thins out the clock upon receipt of the supply of signal En.

The frequency offset correction circuit 1066 is configured by a local oscillator 10661, multipliers 10662 to 10665, and adders 10666, 10667.

The frequency offset correction circuit 1066 reflects the error detection frequency ΔF given by the burst detector 109 in the oscillation output of the local oscillator 10661, complexly multiplies this oscillation output and the signal dc_re at the multipliers 10662 and 10663, complexly multiplies the oscillation output and the signal dc_im at the multipliers 10663 and 10664, adds the outputs of the multiplier 10662 and multiplier 10663 at the adder 10666, and adds the outputs of the multiplier 10664 and multiplier 10665 at the adder 10667 thereby to generate the signal sy_re and signal sy_im as shown in the following Equations (2) and (3) and outputs the same to the OFDM demodulator 107, the delay unit 108, the burst detector 109, and the amplification gain controller 111.

$$sy\_re = dc\_re \times \cos(2\pi f_{cw} t) + dc\_im \times \sin(2\pi f_{cw} t) \quad (2)$$

$$sy\_im = dc\_im \times \cos(2\pi f_{cw} t) - d\_re \times \sin(2\pi f_{cw} t) \quad (3)$$

Figure 13:
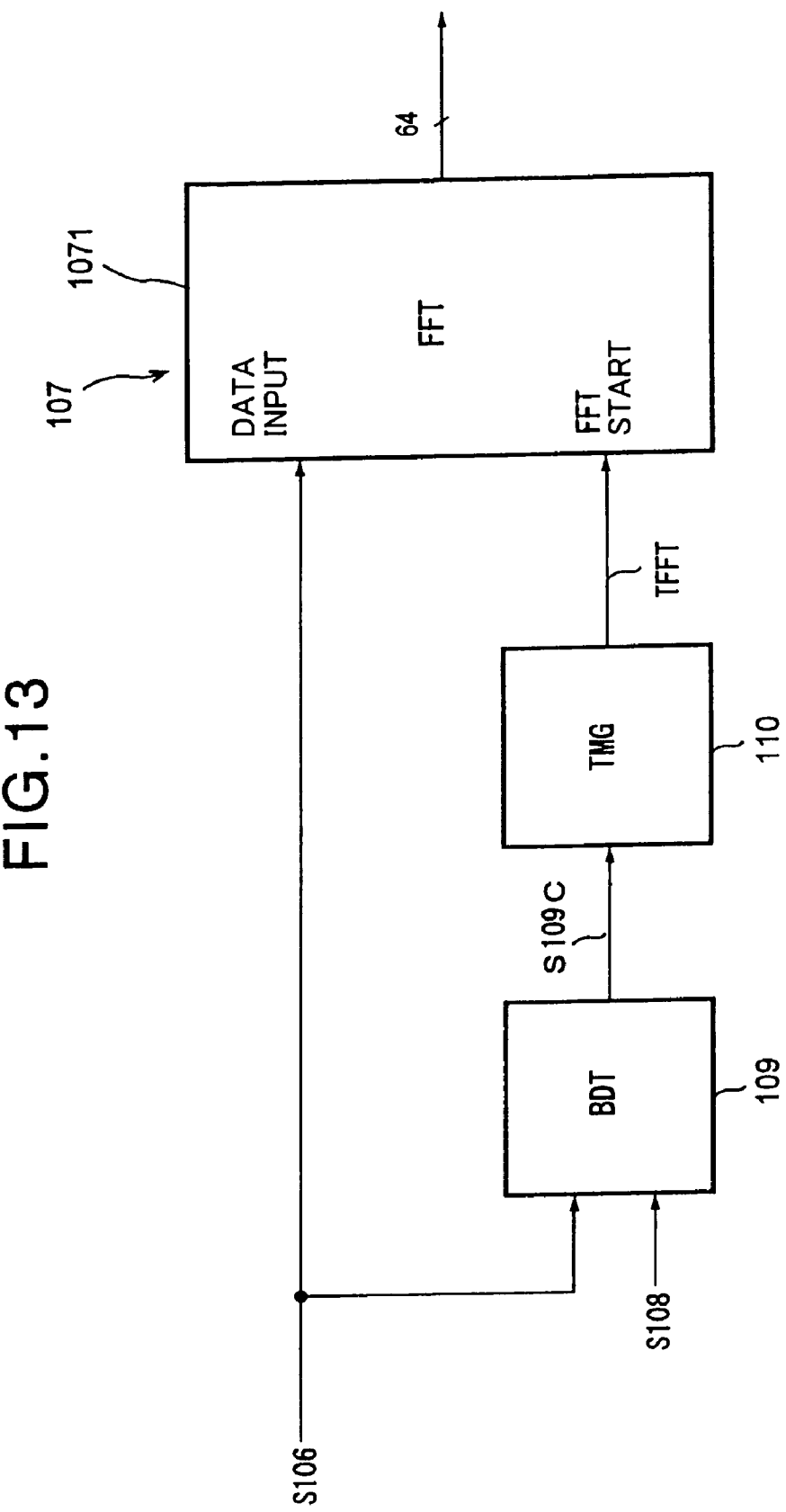
FIG. 13 is a view for explaining the configuration of an OFDM demodulator of FIG. 1.

The OFDM demodulator 107 processes the output signal S106 of the reception processing unit 106, that is, the signals sy_re and sy_im, as shown in FIG. 1 and FIG. 13, by a fast Fourier transform in synchronization with a FFT timing signal TFFT supplied from the timing control unit 110 in the FFT processing unit. 1071 to demodulate the OFDM signal and outputs the result to the next processing circuit.

The delay unit 108 delays the output signal S106 of the reception processing unit 106, that is, the signals sy_re and sy_im, by amount of the burst period for burst detection and outputs the result as a signal S108 to the burst detector 109.

Note that burst detection of the IEEE802.11a system uses a delay of the delay unit 108 of 16 clocks to detect a burst of 16 clock periods.

The burst detection of the BRAN system uses a delay of the delay unit 108 of 32 clocks to detect a burst of an amount of the front half 5 periods. By making the delay of the delay unit 108 16 clocks, it can detect a burst of the rear half 5 periods, but two delaying means having different delays would be required.

The burst detection of the Wireless 1394 system can make the delay of the delay unit 108 32 clocks, to detect a burst of the amount of the front half 5 periods and also can detected a burst of the amount of the rear half 5 periods with the same delay.

The burst detection unit 109 finds the correlation between the signal S106 (signals sy_re and sy_im) from the reception signal processing unit 106 and the delay signal S108 from the delay unit 108, detects the burst signal of a period determined by a communications system, detects the parameters relating to the packet and frame structure, generates first and second synchronization detection signals S109W (xpulse and ypulse) in synchronization with timing signals TMNG (X, Y, C) from the timing controller 110 as a synchronization timing window signal, and outputs the same to the amplification gain controller 111.

Further, the burst detector 109 outputs a synchronization timing window signal S109C for detecting a peak value of a cross-correlation result to the timing controller 110.

Further, the burst detector 109 calculates the error frequency from phase difference between the real portion and imaginary portion of the reception signal based on the correlation result to generate an error detection frequency ΔF and outputs the same to the reception signal processing unit 106.

The timing controller 110 outputs the timing signal TMNG (X, Y) for generating the first and second synchronization detection signals S109W (xpulse and ypulse) from the burst detector 109 to the burst detector 109 triggered by a trigger signal rxwndw.

Further, the timing control unit 110 monitors a peak timing from the cross-correlation result from the burst detector 109, outputs a third synchronization detection signal S110 (cpulse) to the amplification gain controller 111 after a predetermined time from the peak timing, and outputs the FFT timing signal TFFT to the OFDM demodulator 107.

Figure 14:
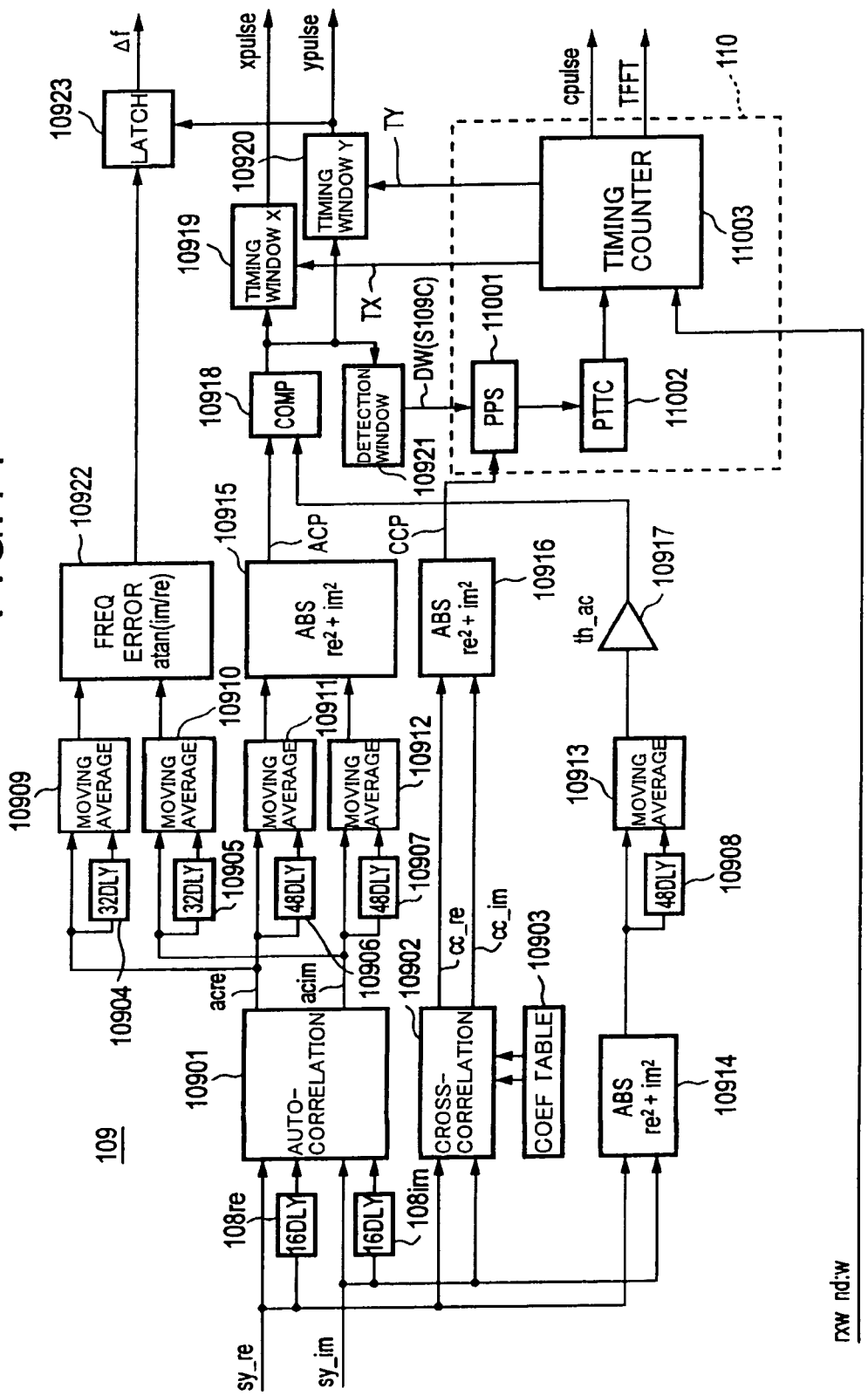
FIG. 14 is a circuit diagram of an example of the concrete configuration of a burst detector and a timing controller of FIG. 1.

FIG. 14 is a circuit diagram showing an example of the concrete configuration of the burst detector 109 and the timing controller 110 of FIG. 1.

The burst detection unit 109 is comprised of an autocorrelation circuit 10901, a cross-correlation circuit 10902, a coefficient table 10903, delay units 10904 and 10905 having delays set to the amount of 32 clocks, delay units 10906 to 10908 having delays set to the amount of 48 clocks, moving average circuits 10909 to 10913, absolute value calculation circuits 10914 to 10916, a threshold value circuit 10917, a comparison circuit 10918, a timing window X circuit 10919, a timing window Y circuit 10920, a detection window circuit 10921, a frequency error detection circuit 10922, and a latch circuit 10923.

Further, the timing control unit 110 has a peak position search (detect) circuit (PPS) 11001, a position/timing conversion circuit 11002 (PTTC), and a timing counter 11003.

The signals sy_re and sy_im supplied from the reception signal processing circuit 106 are input to the auto-correlation circuit 10901, the cross-correlation circuit 10902, and the absolute value calculation circuit 10914.

Further, the signal sy_re is delayed at a delay unit 108re by exactly the amount of 16 clocks and then input to the auto-correlation circuit 10901. Similarly, the signal sy_im is delayed at a delay unit 108im by exactly the amount of 16 clocks and then input to the auto-correlation circuit 10901.

Figure 15:
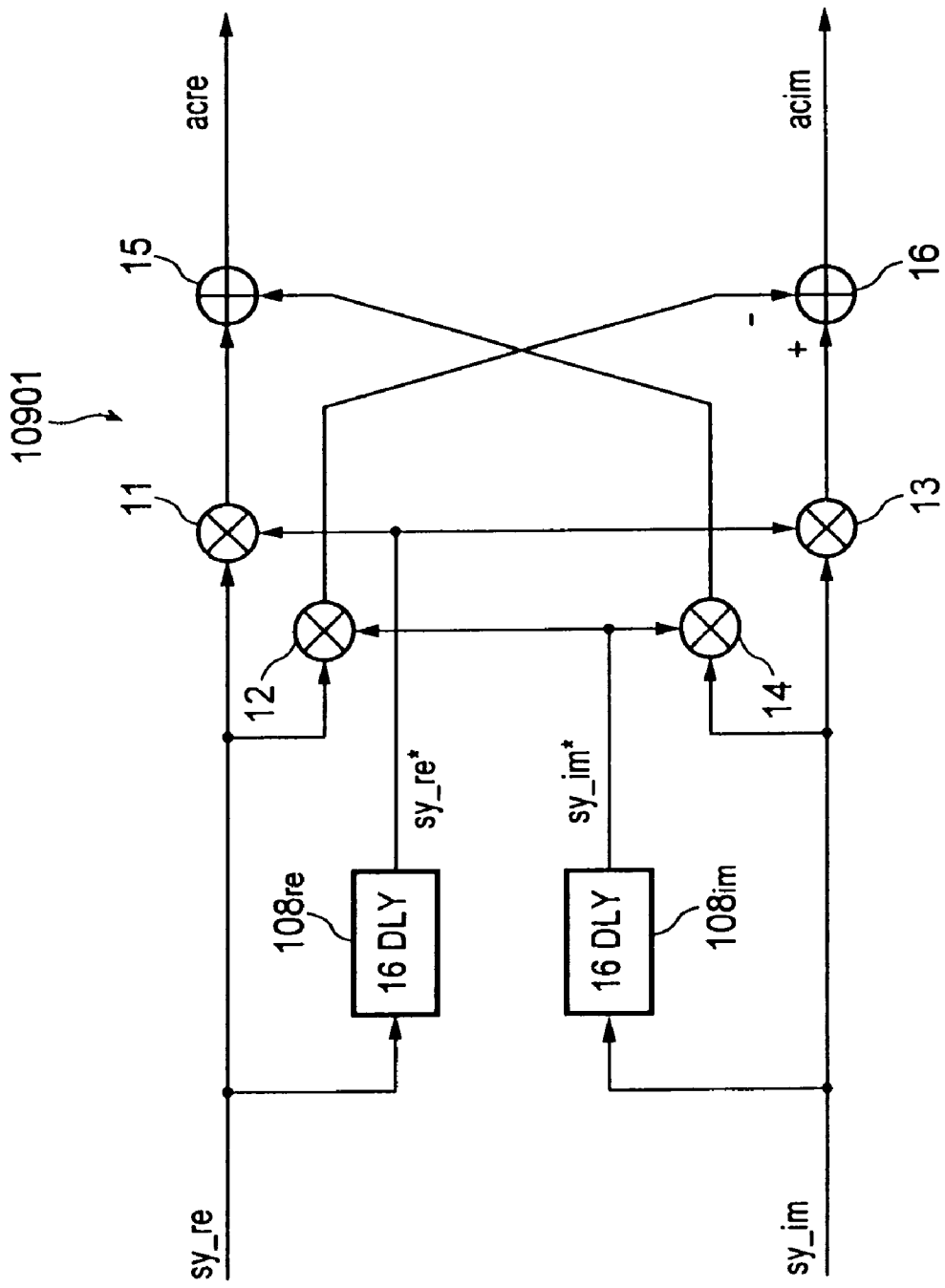
FIG. 15 is a circuit diagram of an example of the configuration of an auto-correlation circuit of FIG. 14.

FIG. 15 is a circuit diagram showing an example of the configuration of the auto-correlation circuit.

The auto-correlation circuit 10901, as shown in FIG. 15, is formed by multipliers 11 to 14 and adders 15 and 16.

The auto-correlation circuit 10901 utilizes the fact that the front half X section and Y section of the preamble signal added to the header of the reception signal are frequency functions of the 16 clocks, performs conjugated complex multiplication on the input signals sy_re and sy_im and outputs sy_re* and sy_im* of the delay units 108re and 108im of the 16 clocks to obtain auto-correlation outputs acre and acim, and outputs the same to the delay units 10904 to 10907 and the moving average circuits 10909 to 10912.

Concretely, the input signal sy_re and the delay signal sy_re* are complex multiplied at the multiplier 11, the input signal sy_re and the delay signal sy_im* are complex multiplied at the multiplier 12, the input signal sy_im and the delay signal sy_re* are complex multiplied at the multiplier 13, the input signal sy_im and the delay signal sy_im* are complex multiplied at the multiplier 14, and the output of the multiplier 11 and the output of the multiplier 14 are added at the adder 15 to thereby obtain the auto-correlation output signal acre, while the output of the multiplier 12 and the output of the multiplier 13 are added at the adder 16 to thereby obtain the auto-correlation output signal acim.

The cross-correlation circuit 10902 has, as shown in FIG. 16, (m−1) number of delay units 21re-1 to 21re-m−1 cascade connected with the input line of the signal sy_re and configuring a shift register, m number of multipliers 22re-1 to 22re-m for multiplying coefficients set in the coefficient table 10903 with respect to the input signal sy_re and output signals of the delay units 21re-1 to 21re-m−1, and an adder 23re for adding the output signals of the m number of multipliers 22re-1 and outputting 22re-m and outputting a cross-correlation output signal cc_re to the absolute value calculation circuit 10916.

Further, the cross-correlation circuit 10902 has, as shown in FIG. 16, (m−1) number of delay units 21im-1 to 21im-m−1 cascade connected with the input line of the signal sy_im and configuring a shift register, m number of multipliers 22im-1 to 22im-m for multiplying coefficients set in the coefficient table 10903 with respect to the input signal sy_im and output signals of the delay units 21im-1 to 21im-m−1, and an adder 23im for adding output signals of m number of multipliers 22im-1 to 22im-m and outputting the cross-correlation output signal cc_im to the absolute value calculation circuit 10916.

The cross-correlation circuit 10902 sequentially writes the input signals sy_re and sy_im in the shift registers, multiplies the values of the taps by the values of the coefficient table 10903 at the multipliers 22re-1 to 22re-m and 22im-1 to 22im-m, and obtains the cross-correlation output signals cc_re and cc_im.

Note that, in the present embodiment, for example, the number of taps of the shift register is set to 32, and the coefficient table stores data value of 32 clocks before the rear half C64 section of the preamble signal.

The output signal acre of the auto-correlation circuit 10901 is input to the moving average circuit 10911 directly and delayed by the amount of 48 clocks through the delay unit 10906, averaged (integrated), and input to the absolute value calculation circuit 10915.

Similarly, the output signal acim of the auto-correlation circuit 10901 is input to the moving average circuit 10912 directly and delayed by the amount of 48 clocks through the delay unit 10907, averaged (integrated), and input to the absolute value calculation circuit 10915.

Then, the real portion re and the imaginary portion im are squared at the absolute value calculation circuit 10915 to calculate an absolute value ($re^2+im^2$) and thereby obtain an auto-correlation power ACP which is then output to the comparison circuit 10918.

Further, the output signal acre of the auto-correlation circuit 10901 is input to the moving average circuit 10909 directly and delayed by the amount of 32 clocks through the delay unit 10904, averaged (integrated), and input to the frequency error detection circuit 10922.

Similarly, the output signal acim of the auto-correlation circuit 10901 is input to the moving average circuit 10910 directly and delayed by the amount of 32 clocks through the delay unit 10905, averaged (integrated), and input to the frequency error detection circuit 10922.

The output signals cc_re and cc_im of the cross-correlation circuit 10902 are squared in the real portion re and the imaginary portion im at the absolute value calculation circuit 10916 to calculate an absolute value ($re^2+im^2$) and thereby obtain a cross-correlation power CCP which is then output to the peak position search circuit 11001 of the timing controller 110.

Further, the input signals sy_re and sy_im are squared in the real portion re and the imaginary portion im at the absolute value calculation circuit 10914 to calculate an absolute value ($re2+im^2$). This is input to the moving average circuit 10913 directly and delayed by the amount of 48 clocks through the delay unit 10908, averaged (integrated), and output to the threshold value circuit 10917.

The threshold value circuit 10917 defines a threshold value th_ac of auto-correlation and supplies a signal in accordance with this to the comparison circuit 10918.

The comparison circuit 10918 compares the auto-correlation power ACP and the auto-correlation threshold value th_ac and outputs the result thereof to the timing window X circuit 10919, the timing window Y circuit 10920, and the detection window circuit 10921.

Due to this, the timing window X circuit 10919 multiplies the timing window with the comparison result of the comparison circuit 10918 and outputs the first synchronization detection signal xpulse to the amplification gain controller 111.

Then, the timing window Y circuit 10920 multiplies the timing window with the comparison result of the comparison circuit 10918 and outputs the second synchronization detection signal ypulse to the amplification gain controller 111.

The detection window circuit 10921 generated a detection window DW for the peak search of the peak position search circuit 11001 of the timing controller 110 and sets the detection window DW as a signal S109C to the peak position search circuit 11001.

In the present embodiment, the cross-correlation detection is performed at the front half of a C region of the rear half of the preamble.

A logical value of the peak detection position is set at the 48th sample from the header of the C region. A detection window is set based on the time in which an auto-correlation result of the rear half Y area exceeds a certain threshold value.

Since a threshold value is used, the reliability of this reference is not high depending on the reception condition or the like.

Therefore, in the present embodiment, the detection window is set in a range of about 10 clocks before and after the point of a predetermined number of samples from the reference. It is possible to make this range variable.

The peak position search circuit 11001 finds the maximal value of a cross-correlation power value CCP of the cross-correlation result in this detection window DW and a position of the same at that time.

As explained above, the peak search is performed by comparing the maximal value output up to now with the size of the present input.

By storing the timing of the detection window DW giving the maximal value, the peak position is finalized at the end of the detection window DW.

Since the peak of the cross-correlation can be obtained when the input signal and an expectation value signal match on the time axis, generating the FFT timing on the basis thereof enables the optimal operation.

The interval from the peak position to the optimal FFT timing is 32 samples (clock).

Here, however, only peak information indicating where the peak in the detection window DW was located can be obtained at the end of the window.

Therefore, through the following procedure, the position/timing conversion circuit (PTTC) 11002 converts the peak information obtained by the peak position search circuit 11001 to a timing on the time axis and presets data by which the timing counter 11003 for counting one symbol can produce (output) the optimal FFT timing signal TFFT based on the converted data to the timing counter 11003

Since the position/timing conversion circuit 11002 knows in advance the relationship between the peak position of the cross-correlation and the optimal FFT timing, if the relative relationship between the rear end (edge) of the detection window DW and the peak position is known, the timing counter 11003a can be optimally preset with the value of the one symbol counter at the rear edge of the detection window DW.

The timing counter 11003 preset once continues to cyclically count the period of one symbol and successively outputs the FFT timing at a constant timing at every symbol.

Here, the data to be preset in the counter 11003 by the position/timing conversion circuit 11002 will be explained with reference to FIG. 17A to FIG. 17D.

FIG. 17A to FIG. 17D are views showing the relationship between a cross-correlation peak position and load data to the counter.

DW shown in FIG. 17A denotes the detection window, CCP shown in FIG. 17B to FIG. 17D denotes the cross-correlation power, and CC denotes a count value of the timing counter.

The example of FIG. 17A to FIG. 17D illustrates a case wherein a window width WW of the detection window DW is set to 9 samples.

The timing counter 11003 is comprised of, for example, a subtraction counter. A data value DT to be loaded is set according to the following equation:

$$DT = 32 - (WW - \alpha) \quad (4)$$

The example of FIG. 17B illustrates a case wherein a peak is detected at the 3rd sample from the front edge of the detection window.

In this case, $32-(9-2)=25$ is loaded in the counter 11003 at the rear edge of the window.

The example of FIG. 17C illustrates a case wherein a peak is detected at the 5th sample from the front edge of the detection window.

In this case, $32-(9-4)=27$ is loaded in the counter 11003 at the rear edge of the window.

The example of FIG. 17D illustrates a case wherein a peak is detected at the 9th sample from the front edge of the detection window.

In this case, $32-(9-8)=31$ is loaded in the counter 11003 at the rear edge of the window.

Note that a in the above equation (4), in the example of FIG. 17A, is set to a value of the number of samples from the front edge of the window where a peak has been detected minus 1, however, the value may be set so that the number of samples is subtracted without change.

For example, if the half value of width of the detection window DW is made 10 samples and a peak is detected at the 7th sample from the front edge of the detection window, then $32-(20-7)=19$ is loaded at the rear edge of the window.

When the peak is at the 15th sample, $32-(20-15)=27$ is loaded.

By doing this, the position information of the peak can be converted to real timing information.

Note that the width WW of the detection window may be set approximately symmetric to the reference position.

Note that when a lower limit for the cross-correlation value is set and the correlation value is less than the lower limit value, it is also possible to configure the system to deem that no peak is detected.

For example, when 0 continues to be input, it is possible to prevent a peak from occurring at the header of the window or rear edge. In this case, it is made that no peak is detected.

Further, when the counter is configured by a down counter, changing the load value of the counter after counting down to 0 enables optimization of the FFT timing even for a packet having a re-synchronization reference symbol inserted between data symbols.

In the case of the Wireless 1394 system, the C region of the rear half of the preamble, as shown in FIG. 4, is formed by a guard interval C16 of 16 samples and two consecutive repeated reference data C64 of 64 samples.

Consequently, after the peak detection is corrected and the counter returns to 0, then 63 is loaded.

On the other hand, in the region of a normal data symbol, 71 is loaded.

Further, in correspondence to the reference symbol in the data symbol, a reference symbol position is calculated and the one symbol counter is adjusted exactly like the C region.

Further, at the boundary with the reference symbol, 80 is loaded in the one symbol counter.

FIG. 18A to FIG. 18D are views showing the operation timing of a timing counter (symbol counter).

Note that FIG. 18D shows a count value TVC and that the timings denoted by (1) and (2) are timings at which data is loaded at the rear edge of the detection window DW.

Further, the timing controller 110 receives a peak timing of the cross-correlation power CCP from the peak position search circuit 11001. The timing counter 11003 outputs the third synchronization detection signal cpulse to the amplification gain controller 111 after a constant time from the peak timing.

FIG. 19A to FIG. 19G are views showing the timing charts from the auto-correlation processing of the burst detector to when the synchronization detection signals xpulse and ypulse are output.

FIG. 19A shows the portion of the preamble and reference of the input signal S106 (sy_re, sy_im), FIG. 19B shows the delay signal S108 obtained by delaying the signal S106 by the delay unit 108, FIG. 19C shows the auto-correlation power ACP, FIG. 19D shows the timing window X, FIG. 19E shows the timing window Y, FIG. 19F shows the first synchronization detection signal xpulse, and FIG. 19G shows the second synchronization detection signal ypulse.

The preamble signal of the Wireless 1394 system, as shown in FIG. 19A and FIG. 19B, there are 5 periods of a 16 clock period X section and Y section. As shown in FIG. 19C, the auto-correlation power ACP rises in the X and Y sections.

Therefore, as shown in FIG. 19A, FIG. 19B, and FIG. 19D, by applying the timing window X to X section of the front half and by applying the timing Y to the Y section of the rear half as shown in FIG. 19A, FIG. 19B, and FIG. 19E, the arrival of each section is detected and thus the first synchronization detection signal xpulse and the second synchronization detection signal ypulse can be output as shown in FIG. 19F and FIG. 19G.

FIG. 20A to FIG. 20G are views showing the timing charts from the cross-correlation processing of the burst detector to when the third synchronization detection signal cpulse and the FFT timing signal TFFT are output.

FIG. 20A shows the inoput signal S106 (sy_re, SY_im), FIG. 20B shows the auto-correlation power ACP, FIG. 20C shows the cross-correlation power CCP, FIG. 20D shows the detection window DW, FIG. 20E shows the load data DT for loading to the counter, FIG. 20F shows the third synchronization detection signal cpulse, and FIG. 20G shows the FFT timing signal TFFT.

In the present embodiment, as the coefficient table 10903 of the cross-correlation, the data values of the front 32 clocks of the C64 section are used. Therefore, as shown in FIG. 20C, the cross-correlation power CCP becomes the maximum at the 32nd clock of the C64 section.

As shown in FIG. 20D, by setting the detection window DW before and after the timing at which the cross-correlation power CCP become the maximum, more correct peak detection can be carried out. Then, as shown in FIG. 20E, at the timing of the rear edge of the detection window DW, the position/timing conversion circuit 11002 presets data able to generate (output) the optimal FFT timing signal TFFT to the timing counter 11003.

Further, 32 clocks after the detected peak timing, as shown in FIG. 20F and FIG. 20G, the third synchronization detection signal cpulse and the FFT timing signal TFFT are output.

Thereafter, as shown in FIG. 20G, the FFT timing signal TFFT is output after 64 clocks, then repeatedly output in 72 clock periods.

The frequency error detection circuit 10922 finds the phase difference from the real portion and imaginary portion of the auto-correlation output signal and calculates the error detection frequency ΔF as shown in the following equation from here:

$$\Delta f = \tan^{-1}(acim/acre) \times (1/32) \times 20 \times 10^6 (\text{Hz}) \quad (5)$$

The amplification gain controller 111 controls the reception signal to become the optimum signal level by performing gain control by changing the control gain voltage Vagc for controlling the gain of the automatic gain control amplifier 101 matched with the synchronization burst detection timing as will be explained in detail later based on the digital reception signal S106 after the gain control by the automatic gain control amplifier 101 from the reception signal processing unit 106, the digital field strength signal RSSID indicating the peak level of the reception signal RS of the reception signal power monitor 102 from the A/D converter 105, the first and second synchronization detection signals S109W (xpulse, ypulse) serving as the synchronization timing window signals from the burst detector 109, and the third synchronization detection signal S110 (cpulse) from the timing controller 110, and outputs the gain control signal Vagc to the automatic gain control amplifier 101 through the D/A converter 104.

Figure 21:
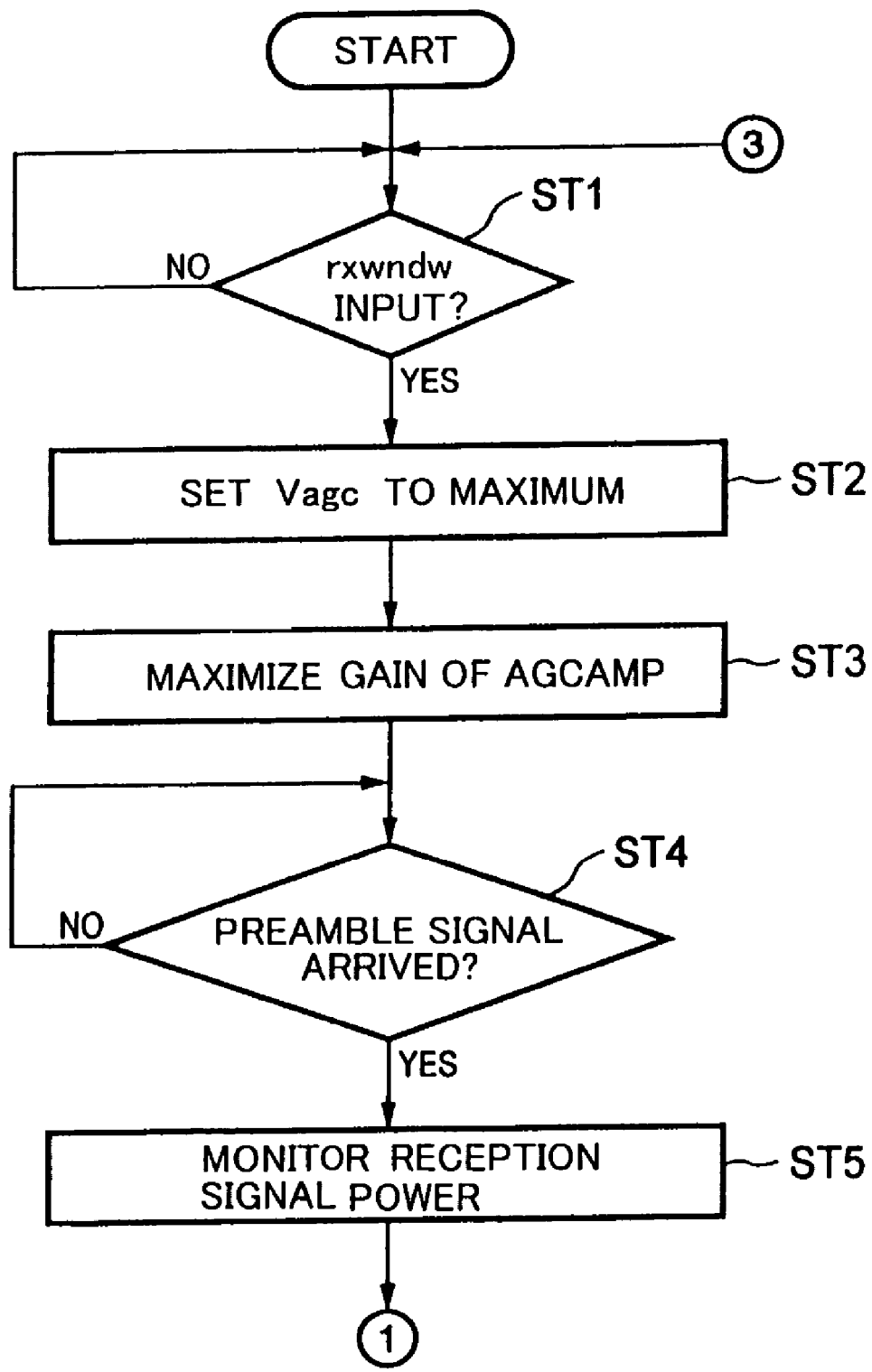
FIG. 21 is a flow chart for explaining a first stage of a gain control operation in the amplification gain controller unit according to the present invention.
Figure 22:
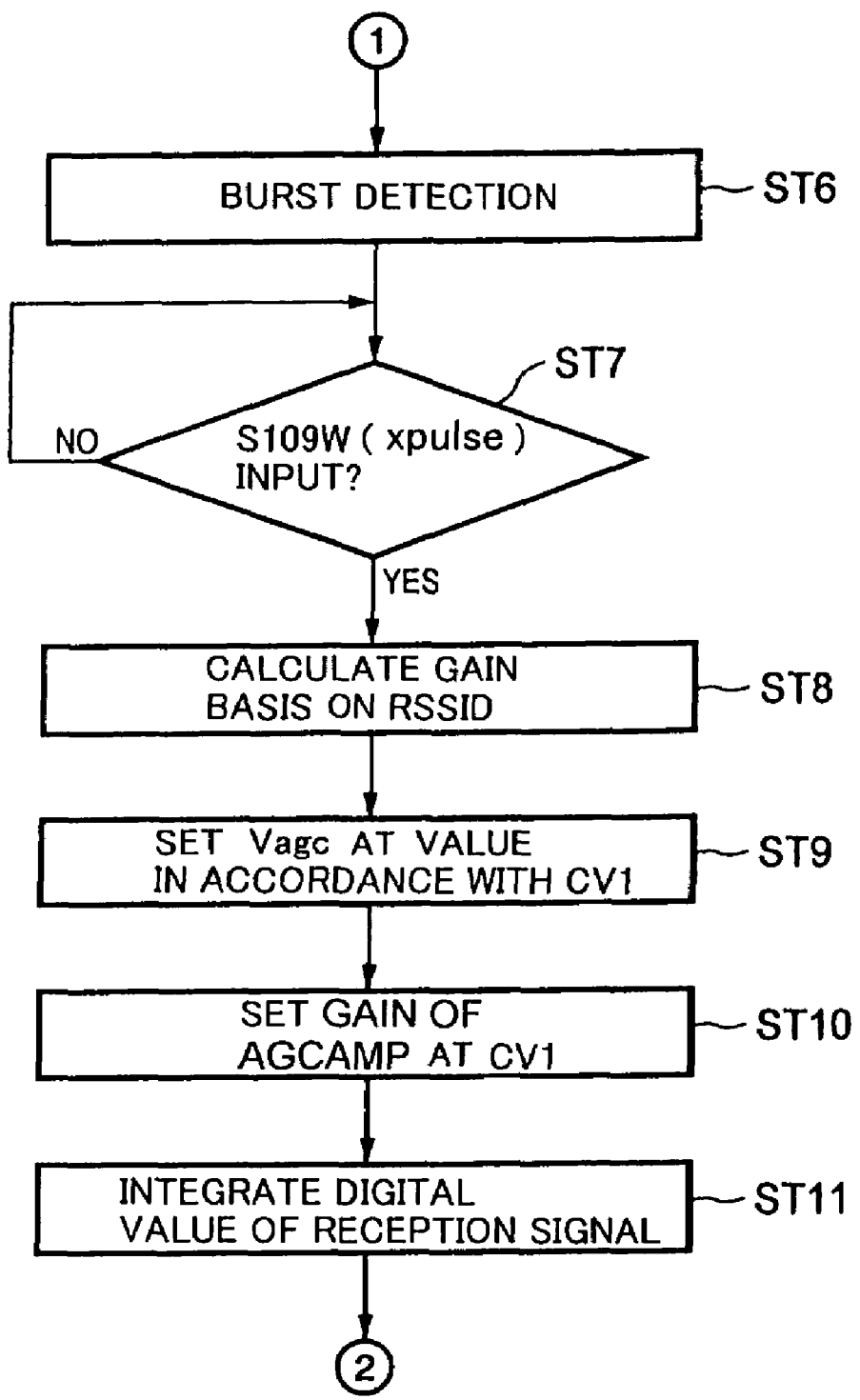
FIG. 22 is a flow chart for explaining a second stage of a gain control operation in the amplification gain controller according to the present invention.
Figure 23:
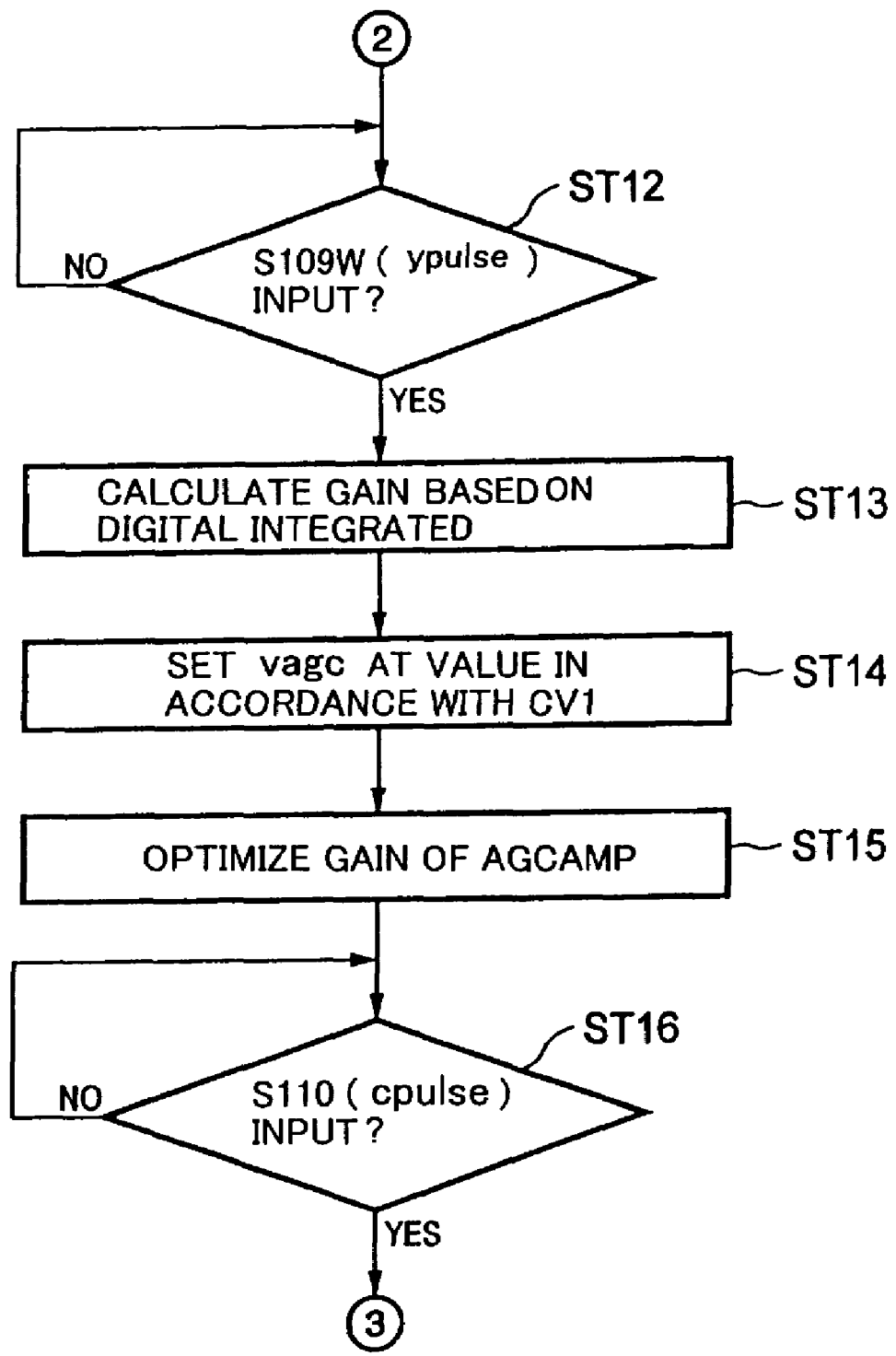
FIG. 23 is a flow chart for explaining a third stage of a gain control operation in the amplification gain controller according to the present invention.

Below, the gain control operation of the amplification gain controller 111 will be explained in detail with reference to the flow charts of FIG. 21, FIG. 22, and FIG. 23.

In the present embodiment, in the preamble section of the reception signal, three stages of level acquisition are performed to realize high-speed and high-performance level acquisition.

As the first stage, at the time of start of the burst detection (ST1), the gain control signal Vagc is output from the amplification gain controller 111 with the maximum value (ST2), the gain of the automatic gain control amplifier 101 is set at the maximum (first gain) (ST3), and the burst detection is carried out by combination of the delay unit 108 and the burst detector 109.

At this time, the output signal of the A/D converter 103 ends up being distorted, but since it is not the data signal, deterioration of the reception signal quality is not induced.

Further, even if the preamble signal is distorted, since the auto-correlation circuit 10901 is used in the burst detector 109, burst detection is possible without lowering the detection rate.

In this way, the arrival of the preamble signal at the header of the reception signal RS is waited for (ST4).

In parallel to this, the reception signal power is monitored at the reception signal power monitor 102, and the field strength signal RSSI of the reception signal power signal is input as the digital signal RSSID through the A/D converter 105 (ST5).

Here, as explained above, in order to deal with abrupt signal changes, not the average value, but the peak value is detected. Note that, the reset signal is given at the time of starting of the burst detection, the peak value detection circuit is reset, and the maximum peak value after that is observed.

As the second stage, at the time of burst detection (ST6), upon receipt of the first synchronization detection signal S109W (xpulse) of the burst detector 109 (ST7), the gain is calculated based on the level of the digital field strength signal RSSID (ST8), the gain control signal Vagc is set at the calculated value CV1 (ST9), and the gain of the automatic gain control amplifier 101 is set at the calculated value CV1 (second gain) through the D/A converter 104 (ST10).

A control gain CG1 at this time is calculated based on the following equation:

$$CG1(dB) = VRSSI(dBv) - Vref1(dBv) \quad (6)$$

Here, the VRSSI expresses the value of the reception signal power value monitored at the reception signal power monitor 102, and Vref1 expresses the first reference signal power value of a suitable value not distorting the A/D converter 103.

Note, at this time, the gain of the automatic gain control amplifier 101 includes the analog signal processing in the calculation step of the peak value of the reception signal power and includes slight variation, so is rough gain control.

For this reason, after passing this gain through the A/D converter 103 without distortion, the digital value of the reception signal is integrated at the amplification gain controller 111 to measure the correct signal power (ST11).

As the third stage, after a certain time passes in the second stage, by receiving the second synchronization detection signal S109W (ypulse) of the burst detector 109 (ST12), the gain is calculated based on the digital integrated value of the reception signal S106 passed through the A/D converter 103 without distortion (ST13), the gain control signal Vagc is set at a calculated value CV2 (ST14), and the gain of the auto-correlation gain control amplifier 101 is set at the calculated value CV2 (third gain) through the D/A converter 104 and optimized (ST15).

The control gain CG2 at this time is calculated based on the following equation:

$$CG2(dB)=VI(dBv)-Vref2(dBv) \tag{7}$$

Here, VI expresses the value of the reception signal power value integrated at the amplification gain controller 111 and after passed through the A/D converter 103, while Vref2 expresses the second reference signal power value and the optimal value of the reception signal power after gain control.

In this way, the optimized gain value is fixed until the data signal is terminated thereafter and the next burst detection starts (ST16).

Then, when the third synchronization detection signal S110 (cpulse) from the timing controller 110 is input, the operation routine shifts to the processing of the above step ST1.

Note that, since the burst detection is started, the reset signal is given to the reception signal power monitor 102, the peak detection circuit 1021 is reset, and the maximum peak value after that is observed.

By the above, a high-speed and correct level acquisition to the optimal gain value can be realized.

Figure 24:
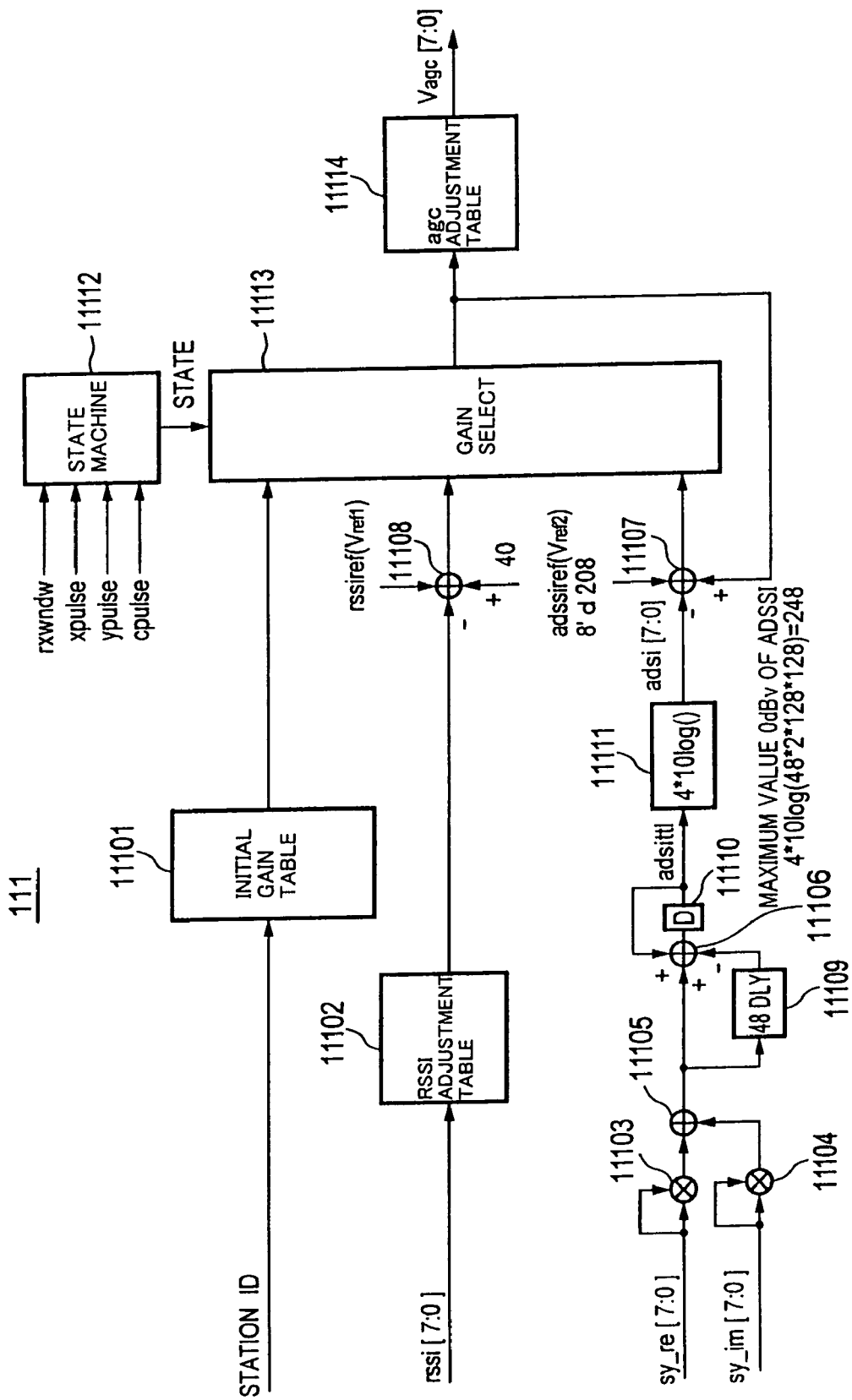
FIG. 24 is a circuit diagram of an example of the concrete configuration of the amplification gain controller of FIG. 1.

FIG. 24 is a circuit diagram showing an example of the concrete configuration of the amplification gain controller 111 of FIG. 1.

The amplification gain controller 111 has, as shown in FIG. 24, an initial gain table 11101, an RSSI adjustment table 11102, multipliers 11103, 11104, adders 11105 to 11108, a delay unit 11109 having a delay of the amount of 48 clocks, a delay device 11110, a logarithm converter 11111, a state machine circuit 11112, a gain selection circuit 11113, and a control gain adjustment table 11114.

The amplification gain controller 111 employs a state machine configuration based on the timing pulses of the synchronization detection, that is, the trigger signal rxwndw, the first synchronization detection signal xpulse and the second synchronization detection signal ypulse from the burst detector 109, and the third synchronization detection signal cpulse from the timing controller 110, and controls the different gain agc of the automatic gain control amplifier 101 to be output in the state 0 to 3.

FIG. 25A to FIG. 25H are views showing timing charts for explaining the operation of the amplification gain controller of FIG. 24.

Figure 25:
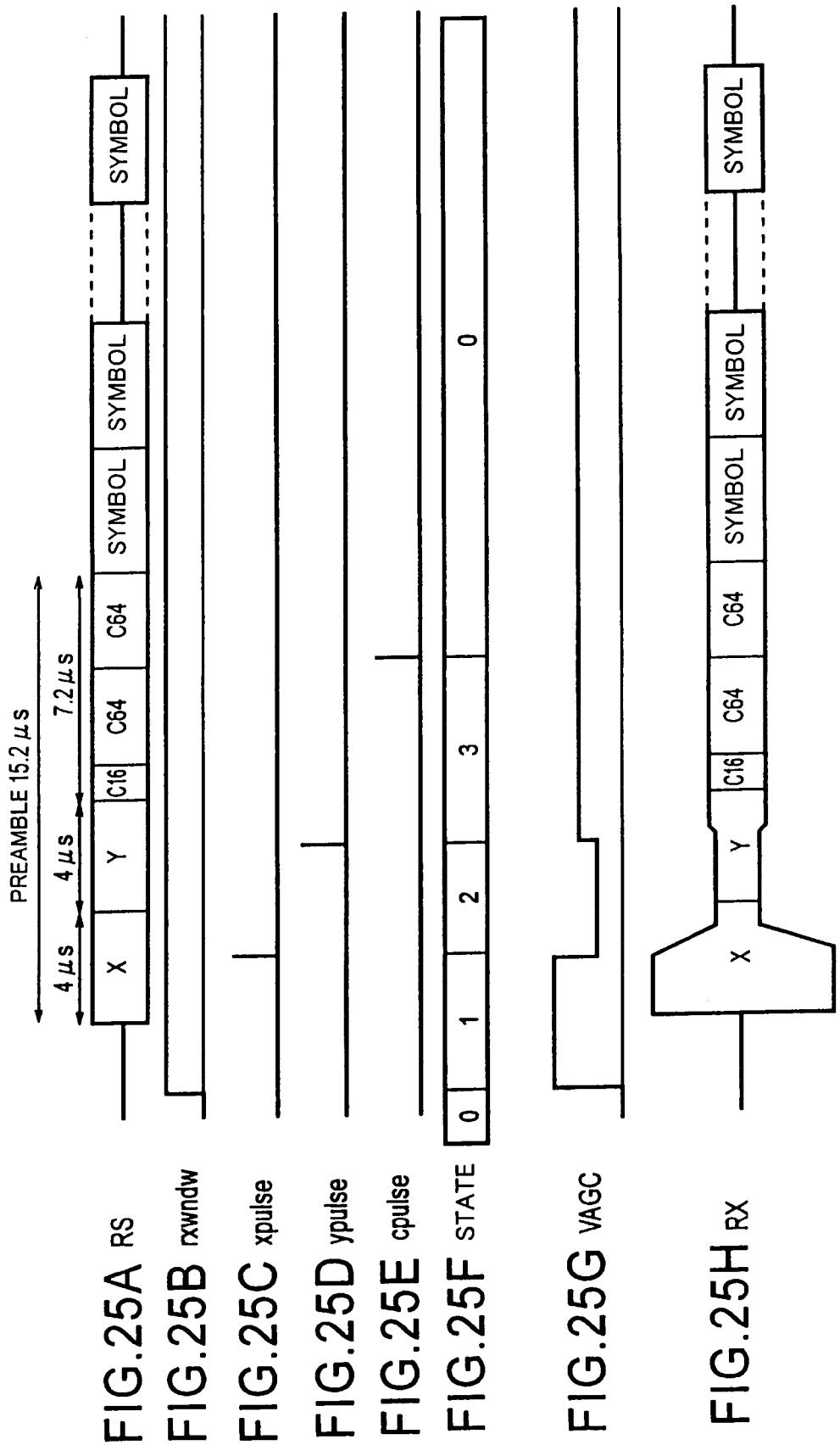
FIG. 25A to FIG. 25H are views showing timing charts for explaining an operation of an amplification gain controller of FIG. 24.

FIG. 25A shows the input signal S106 (sy_re, sy_im), FIG. 25B shows the trigger signal rxwndw, FIG. 25C shows the first synchronization detection signal xpulse, FIG. 25D shows the second synchronization detection signal ypulse, FIG. 25E shows the third synchronization detection signal cpulse, FIG. 25F shows the state, FIG. 25G shows the gain control signal Vagc, and FIG. 25H shows the reception signal RX output from the automatic gain control amplifier 101.

Below, an explanation will be given of an operation in each of the states in the amplification gain controller of FIG. 24 with reference to FIG. 25A to FIG. 25H.

State 0 (Initial Mode, rxwndw Waiting Mode)

A proper gain is selected from the initial gain table 11101 based on the flag signal Station ID. In the present embodiment, the initial gain table 11101 is set so that the maximum gain is obtained.

Then, as shown in FIG. 25B, FIG. 25F, and FIG. 25G, at a rising time of the trigger signal rxwndw, the trigger signal rxwndw is passed through the gain selection circuit 11113 and output from the control gain adjustment table 11114 as the gain control signal Vagc, then the operation routine shifts to the State 1.

State 1 (xpulse Waiting Mode)

As shown in FIG. 25F and FIG. 25G, as the gain control signal Vagc, the initial gain (maximum gain) determined by the initial gain table 11101 is output.

Upon receipt of the field strength signal RSSI through the A/D converter 105, the RSSI gain gain_rssi based on the reception signal power is calculated at the adder 11108 as in Equation (8). Then, as shown in FIG. 25C, FIG. 25F, and FIG. 25G, at the input timing of the first synchronization detection signal xpulse, the selected gain of the gain selection circuit 11113 is switched from the initial gain to the RSSI gain gain_rssi is by the adder 11108 and output from the control gain adjustment table 11114 as the gain control signal Vagc, then the operation routine shifts to the state 2.

$$gain\_rssi=rssiref-rssi+40 \tag{8}$$

Here, rssiref is the value reduced by 40 in advance due to the bit width being determined as 8 bits in the RSSI reference value and is corrected by adding 40 at the time of calculating the gain.

State 2 (ypulse Waiting Mode)

As shown in FIG. 25F and FIG. 25G, as the gain control signal Vagc, the RSSI gain gain_rssi is output.

By squaring the input signal sy_re at the multiplier 11103, squaring the input signal sy_im at the multiplier 11104, and adding them at the adder 11105, the amplitude of the input reception signal is found. Further, the digital integrated value is found through the adder 11106, the delay unit 11109, and the delay unit 11110, and the reception signal level adssi is calculated as in Equation (9) in the logarithm converter 11111.

$$adssi=4\times10\log(re^2+im^2) \tag{9}$$

Then, using the reception signal level adssi, and the optimal value adssiref of the reception signal power after gain control, and the now selected RSSI gain, gain_rssi, the adssi gain gain_rssi is calculated as in Equation (10). Then, as shown in FIGS. 25D, 25F, and 25G, at the input timing of the second synchronization detection signal ypulse, the selected gain of the gain selection circuit 11113 is switched from the RSSI gain gain_rssi to the adssi gain gain_rssi by the adder 11108 and output from the control gain adjustment table 11114 as the gain control voltage signal Vagc, then the operation routine shifts to the state 3.

$$gain\_adssi = adssiref - adssi + gain\_rssi \qquad (10)$$

State 3 (cpulse Waiting Mode)

As shown in FIG. 25F and FIG. 25G, as the gain control signal Vagc, the adssi gain gain_rssi is output.

Then, as shown in FIG. 25E and FIG. 25F, the operation routine shifts to state 0 at the input timing of the third synchronization detection signal cpulse.

Note, the gain control voltage signal Vagc, holds the adssi gain gain_rssi.

Next, the operation by the configuration of FIG. 1 will be explained.

First, at the start of the burst detection, the gain control signal Vagc is set at a maximum value and output triggered by the trigger signal rxwndw by the amplification gain controller 111. The gain control signal Vagc is converted to an analog signal by the D/A converter 104 and supplied to the automatic gain control amplifier 101.

The automatic gain control amplifier 101 receives the analog signal of the gain control signal Vagc and sets the gain at the maximum first gain.

In this state, the state of waiting for the input of the reception signal RS is entered.

In such a state, first, the preamble signal at the header of the reception signal RS is input to the automatic gain control amplifier 101.

The automatic gain control amplifier 101 amplifies a schematically the X section of the front half of the preamble signal of the reception signal RS with the maximum gain and outputs the result to the A/D converter 103 as the signal RX.

In parallel to this, the preamble signal of the reception signal RS is input to the reception signal power monitor 102. The reception signal power monitor 102 monitors the power of the reception signal RS, measures the peak voltage, converts the result to the field strength signal RSSI of the voltage signal taking a value corresponding to the input reception signal level, and output the result to the A/D converter 105.

The field strength signal RSSI of the reception signal power signal is input through the A/D converter 105 to the amplification gain controller 111 as the digital signal RSSID.

The A/D converter 103 converts the preamble signal portion of the reception signal RS from an analog signal to a digital signal and supplies the results as the signal RXD to the reception signal processing unit 106.

At this time, the output signal of the A/D converter 103 ends up being distorted, but it is not the data signal, so deterioration of the reception signal quality is not caused.

The reception signal processing unit 106 converts the input digital reception signal RXD to baseband signals bb_re (real portion) and bb_im (imaginary portion) and converts the sampling frequency of the baseband signal to a low frequency.

Then, at this time, since the error detection frequency ΔF by the burst detector 109 has not been supplied, the frequency offset is not corrected, and the signal S106 (sy_re and sy_im) is generated and output to the OFDM demodulator 107, the delay unit 108, and the burst detector 109.

The delay unit 108 delays the output signal S106 of the reception signal processing unit 106, that is, the signals sy_re and sy_im, by the amount of the burst period for burst detection and outputs the result as the signal S108 to the burst detector 109.

The burst detector 109 performs auto-correlation and cross-correlation between the signals S106 (sy_re and sy_im) from the reception signal processing unit 106 and the delay signal S108 from the delay unit 108.

Then, it detects the burst signal of the period determined by the communication system based on the auto-correlation result, first, the first synchronization detection signal S109W (xpulse) indicating that the front half X section of the preamble signal is detected and outputs it to the amplification gain controller 111.

Note that, even if the preamble signal is distorted, since the burst detector 109 uses the auto-correlation circuit, burst detection is possible without lowering the detection rate.

Further, the burst detector 109 calculates the error frequency from the phase difference between the real portion and imaginary portion of the reception signal based on the auto-correlation result, generates the error detection frequency ΔF, and outputs it to the reception signal processing unit 106.

The amplification gain controller 111 receives the burst synchronization detection signal S109W (xpulse) from the burst detector 109, calculates the gain based on the level of the digital field strength signal RSSI, and sets the gain control signal Vagc at the calculated value CV1.

The gain control signal Vagc is converted to an analog signal at the D/A converter 104 and supplied to the automatic gain control amplifier 101.

The automatic gain control amplifier 101 receives the analog signal of the gain control signal Vagc and sets the gain at the second gain of the calculated value.

Note, at this time, the gain of the automatic gain control amplifier 101 includes the analog signal processing in the calculation step of the peak value of the reception signal power and includes slight variation, so is rough gain control.

The automatic gain control amplifier 101 amplifies the remaining of the X section and Y section of the rear half of the preamble signal of the reception signal RS with the second gain in accordance with the reception signal level and outputs the result as the signal RX to the A/D converter 103.

The A/D converter 103 converts the preamble signal portion of the reception signal RS from an analog signal to a digital signal and supplies the result as the signal RXD to the reception signal processing unit 106.

At this time, since the input signal of the A/D converter 103 is amplified with a gain based on a suitable value not distorting the A/D converter 103, distortion does not occur in the output signal of the A/D converter 103.

The reception signal processing unit 106 converts the input digital reception signal RXD to the baseband signals bb_re (real portion) and bb_im (imaginary portion) and converts the sampling frequency of the baseband signal to a low frequency.

Then, the reception signal processing unit 106 corrects the frequency offset based on the error detection frequency ΔF from the burst detector 109, generates the signal S106 (sy_re and sy_im), and outputs it to the OFDM demodulator 107, the delay unit 108, and the burst detector 109.

The delay unit 108 delays the output signal S106 of the reception signal processing unit 106, that is, the signals sy_re and sy_im, by the amount of the burst period for burst detection and then outputs the result as the signal S108 to the burst detector 109.

The burst detector 109 performs auto-correlation and cross-correlation between the signal S106 (sy_re and sy_im) from the reception signal processing unit 106 and the delay signal S108 from the delay unit 108.

Then, based on the auto-correlation result, it detects the burst signal of a period determined by the communications system, generates the synchronization detection signal S109W (xpulse) indicating that the rear half Y section of the preamble signal has been detected, and outputs it to the amplification gain controller 111.

Further, the burst detector 109 calculates the error frequency from the phase difference between the real portion and imaginary portion of the reception signal based on the auto-correlation result, generates the error detection frequency $\Delta F$, and outputs it to the reception signal processing unit 106.

The amplification gain controller 111 receives the signal S106 with the gain based on the reception signal power and passed through the A/D converter 103 without distortion, integrates the digital value of the reception signal, and measures the correct signal power.

Further, the amplification gain controller 111 receives the second synchronization detection signal S109W (ypulse) from the burst detector 109, calculates the gain based on the digital integrated value of the reception signal S106 passed through the A/D converter 103 without distortion, and sets the gain control signal Vagc at the calculated value CV2.

The gain control signal Vagc is converted to an analog signal at the D/A converter 104 and supplied to the automatic gain control amplifier 101.

The automatic gain control amplifier 101 receives the analog gain control signal Vagc and sets the gain at the third gain of the optimum calculated value.

The automatic gain control amplifier 101 amplifies the remaining Y section and the references C64 after C16 of the preamble signal of the reception signal RS with a third gain in accordance with the reception signal level and outputs the result as the signal RX to the A/D converter 103.

The A/D converter 103 converts the references C64 and the data portion of the reception signal RS from an analog signal to a digital signal and supplies the result as the signal RXD to the reception signal processing unit 106.

At this time, since the input signal of the A/D converter 103 is amplified with a gain based on a optimum value not distorting the A/D converter 103, distortion does not occur in the output signal of the A/D converter. 103.

The reception signal processing unit 106 converts the input digital reception signal RXD to the baseband signals bb_re (real portion) and bb_im (imaginary portion) and converts the sampling frequency of the baseband signal to a low frequency.

Then, it corrects the frequency offset based on the error detection frequency $\Delta F$ from the burst detector 109, generates the signal S106 (sy_re and sy_im), and outputs it to the OFDM demodulator 107, the delay unit 108, and the burst detector 109.

The delay unit 108 delays the output signal S106 of the reception signal processing unit 106, that is, the signals sy_re and sy_im, by the amount of the burst period for burst detection and outputs the result as the signal S108 to the burst detector 109.

The burst detector 109 performs the auto-correlation between the signal S106 (sy_re and sy_im) from the reception signal processing unit 106 and the delay signal S108 from the delay unit 108 and performs the cross-correlation at the front half of the C region of the rear half of the preamble.

Further, the burst detector 109 generates the detection window DW for the peak detection of the peak position search circuit 11001 of the timing controller 110 by the detection window circuit 10921 based on the auto-correlation result and sets it in the peak position search circuit 11001 of the timing controller 110.

Then, it supplies the cross-correlation power of the cross-correlation result to the timing controller 110.

The peak position search circuit 11001 finds the maximal value of the cross-correlation power value CCP of the cross-correlation result in this detection window DW and the position of the same at that time.

Note, here, only peak information indicating where the peak in the detection window DW was located can be obtained at the end of the detection window DW.

Next, the position/timing conversion circuit 11002 converts the position information obtained by the peak position search circuit 11001 to a timing on the time axis and presets data by which the timing counter 11003 for counting one symbol can generate (output) an optimal FFT timing signal TFFT in the timing counter 11003 based on the converted data.

The timing counter 11003 preset once continues to cyclically count the period of one symbol and successively outputs the FFT timing signal TFFT at a constant timing at every symbol.

Then, the third synchronization detection signal S110 (cpulse) is output to the amplification gain controller 111 after a predetermined time from the peak timing, and the FFT timing signal TFFT is output to the OFDM demodulator 107 at the time the preset data is counted down.

The amplification gain controller 111 receiving the third synchronization detection signal S110 (cpulse), returns to the initial mode, that is, the waiting mode of trigger signal rxwndw waiting mode.

Thereafter, the optimized gain value is fixed until after the data signal is terminated after that the next burst detection starts.

The OFDM demodulator 107 processes the output signal S106 of the reception signal processing unit 106, that is, the signals sy_re and sy_rim, by a fast discrete Fourier transform in synchronization with the FFT timing signal TFFT supplied from the timing controller 110 to demodulate the OFDM signal.

As explained above, according to the present first embodiment, performs AGC control and frequency offset correction by the burst detector 109 and the amplification gain controller 111 using the synchronization training signal (burst signal) added at the header of the reception signal (packet), then provides a detection window period for cross-correlation detection, performs peak detection of the cross-correlation in the detection window DW by the timing controller 110, and loads data corresponding to the peak position in the counter 11003 for counting the OFDM symbol section in the end (rear edge) of the window, thereby enabling an optimal FFT timing to be set irrespective of the condition of a channel.

Further, the window width for detection can be varied in accordance with the conditions, so the width thereof can be set in accordance with the reception condition making it possible to efficiently set an optimal FFT timing corresponding to the channel.

Further, by adopting a configuration providing a lower limit for the cross-correlation value and deeming that no peak is detected when the correlation value is less than the lower limit value, when 0 continues to be input, it is possible to prevent a peak from occurring at header of the window or rear edge if under this state.

Further, when configuring the counter by a down counter and changing the load value of the counter after counting down to 0, optimization of the FFT timing becomes easy even for a packet having a resynchronization reference symbol inserted between data symbols.

Further, according to the first embodiment, by providing the amplification gain controller 111 for outputting a gain control signal to the automatic gain control amplifier 101 for amplification by the maximum value upon receipt of a trigger signal indicating the start of burst detection; calculating a second gain based on the reception signal power value detected by the reception signal power monitor 102, outputting a gain control signal to the automatic gain control amplifier 101 for amplification by the second gain, receiving a digital reception signal amplified with the second gain and integrating it to obtain the reception signal power value upon receipt of the first burst synchronization detection signal of the burst detector 109, and calculating a third gain based on the obtained reception signal power value and outputting a gain control signal to the automatic gain control amplifier 101 for amplification by the third gain upon receipt of the second burst synchronization detection signal of the burst detector 109, the following effects can be attained.

High-speed and precise level acquisition becomes possible. As a result, there is the advantage that a high-performance reception quality can be realized in a burst synchronization type communications system such as a wireless LAN.

Further, when the burst detection can be carried out for the preamble signal in two stages, by performing rough gain control at the time of the first burst detection and performing precise gain control at the time of the next burst detection, recovery where the timing of the first burst detection is mistaken can be carried out.

Further, it is possible to specify the pattern of the signal to be digitally integrated perform more correct level acquisition.

Further, even in a cases where the first burst detection is mistaken, it is possible to judge whether or not the second burst detection can be carried out and level acquisition at the erroneous timing can be avoided.

Note that when the second burst detection is not performed even if a constant time elapses after the first burst detection, by resetting the level acquisition and returning to the first stage of level acquisition, detection of the burst signal coming next with a high probability can be enabled.

Further, when the synchronization transfer mode is supported and the reference signal is inserted for every constant period in the data signal, by finely adjusting the level acquisition for every reference signal, there is the advantage that level acquisition under a multi-path environment can be more correctly realized.

Second Embodiment

Figure 26:
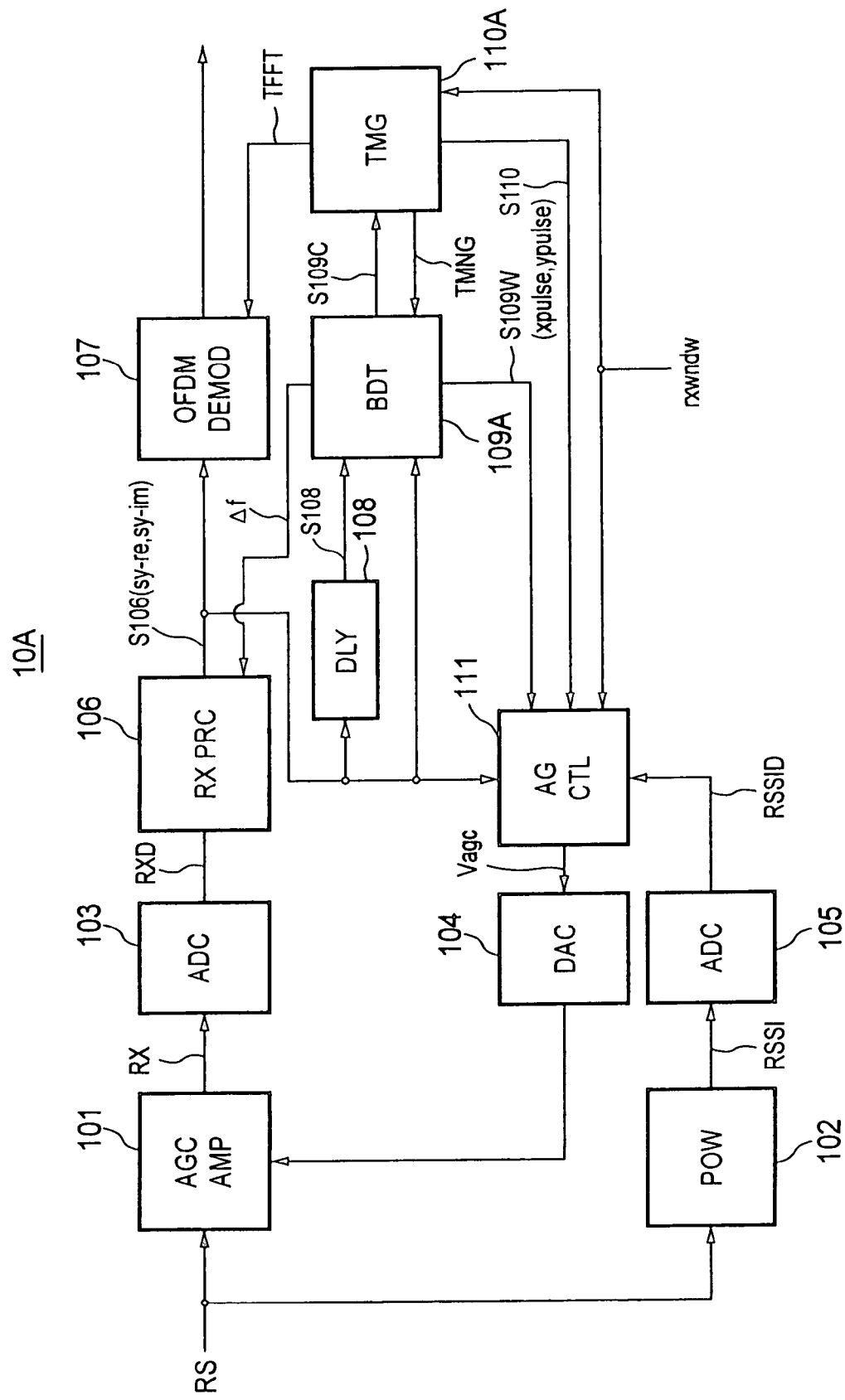
FIG. 26 is a block diagram of the configuration of a second embodiment of the burst synchronization demodulation apparatus to which the FFT timing generation circuit according to the present invention is applied.
Figure 27:
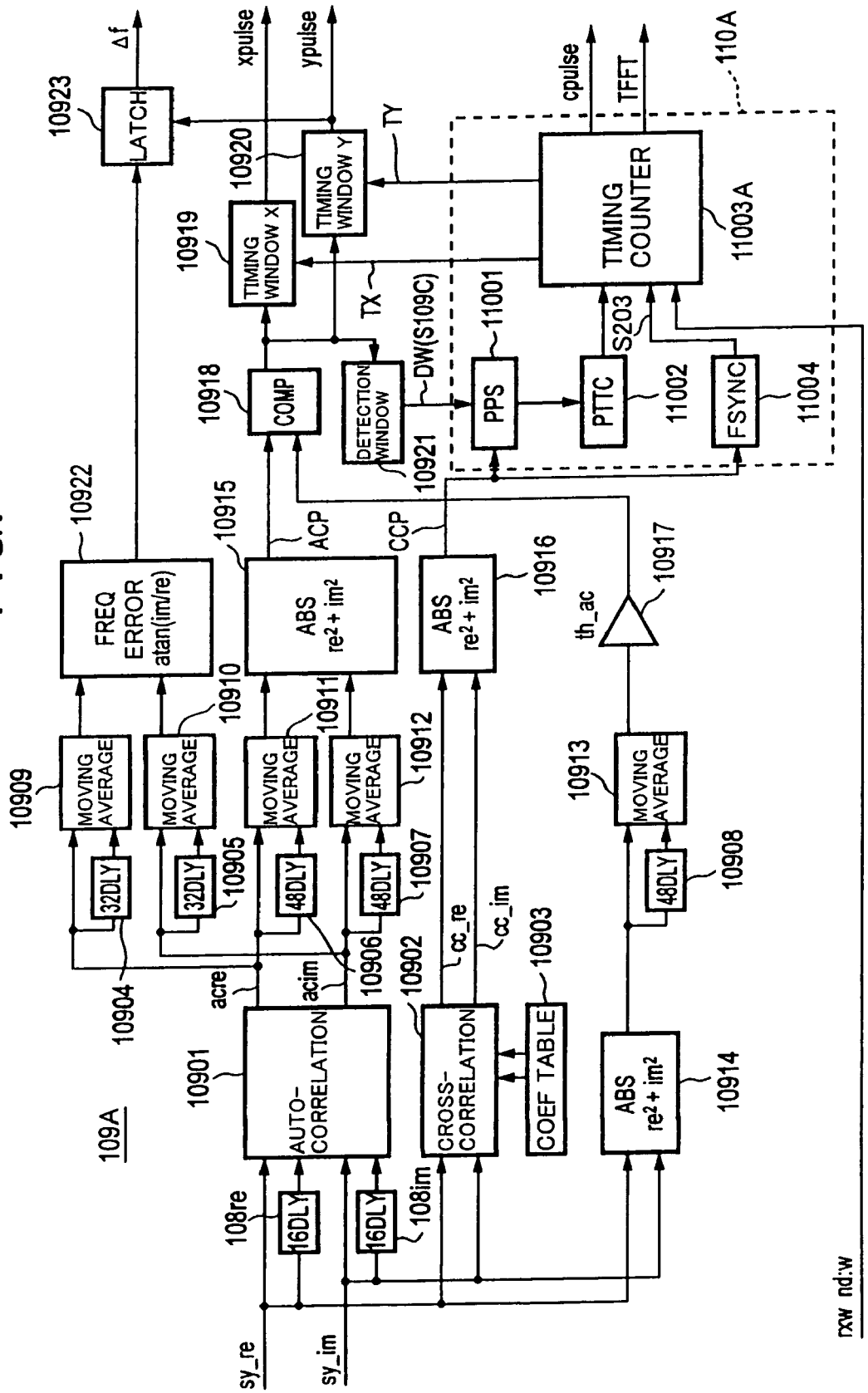
FIG. 27 is a circuit diagram of an example of the concrete configuration of a burst detector and a timing control unit of FIG. 26 according to the present second embodiment.

FIG. 26 is a block diagram of the configuration of a second embodiment of a burst synchronization demodulation apparatus to which the FFT timing generation circuit according to the present invention is applied. Further, FIG. 27 is a circuit diagram of an example of the concrete configuration of a burst detector and a timing controller of FIG. 26 according to the second embodiment.

The present second embodiment is different from the above explained first embodiment in the point that a frame synchronization function is added to the burst detector and the timing controller.

Specifically, in the present second embodiment, by calculating cross-correlation of frame synchronization data (already known) and input data, detecting a peak only for values in a detection window and exceeding a detection threshold value, and setting a detection window based on a frame period counted by a reference clock of a receiving side (mobile station side) after synchronization is established, and thereby configuring a burst synchronization system high in compliance and stability, a more optimum demodulation timing of the reception signal is realized.

In the present second embodiment, in addition to the configuration of FIG. 14, the timing controller 110A is provided with a frame synchronization circuit 11004.

Below, the basic principle of the frame synchronization system of the second embodiment and the specific configurations and functions of newly added, components of FIG. 26 and FIG. 27 will be explained in order.

To realize the frame synchronization system provided with such operating conditions, it is necessary that:

A) the frame period of a transmitting side (base station side) be faithfully reproduced at a receiving side (mobile station side) and B) compliance with a change of the frame period of the base station be made higher.

To satisfy condition A), it is necessary to obtain an average of the offsets in frame synchronization timing over many frames.

The offset that can actually be detected at each frame is in 1 clock units, however if combining a plurality of these and obtaining their average, synchronization of the transmitting side (base station side) can be reproduced at a precise of less than the decimal point.

With this, however, condition B), that is, compliance with changes in the frame period on the base station side is not possible. This is because even if a large offset is input to the averaging circuit, it cannot be immediately reflected in the average result.

Therefore, if a correlation value exceeding a threshold value is obtained, its peak timing is used to directly correct the frame counter itself.

If the amount of change of a frame period per frame is less than half a detection window width, compliance is possible as long as correlation can be detected.

Figure 28:
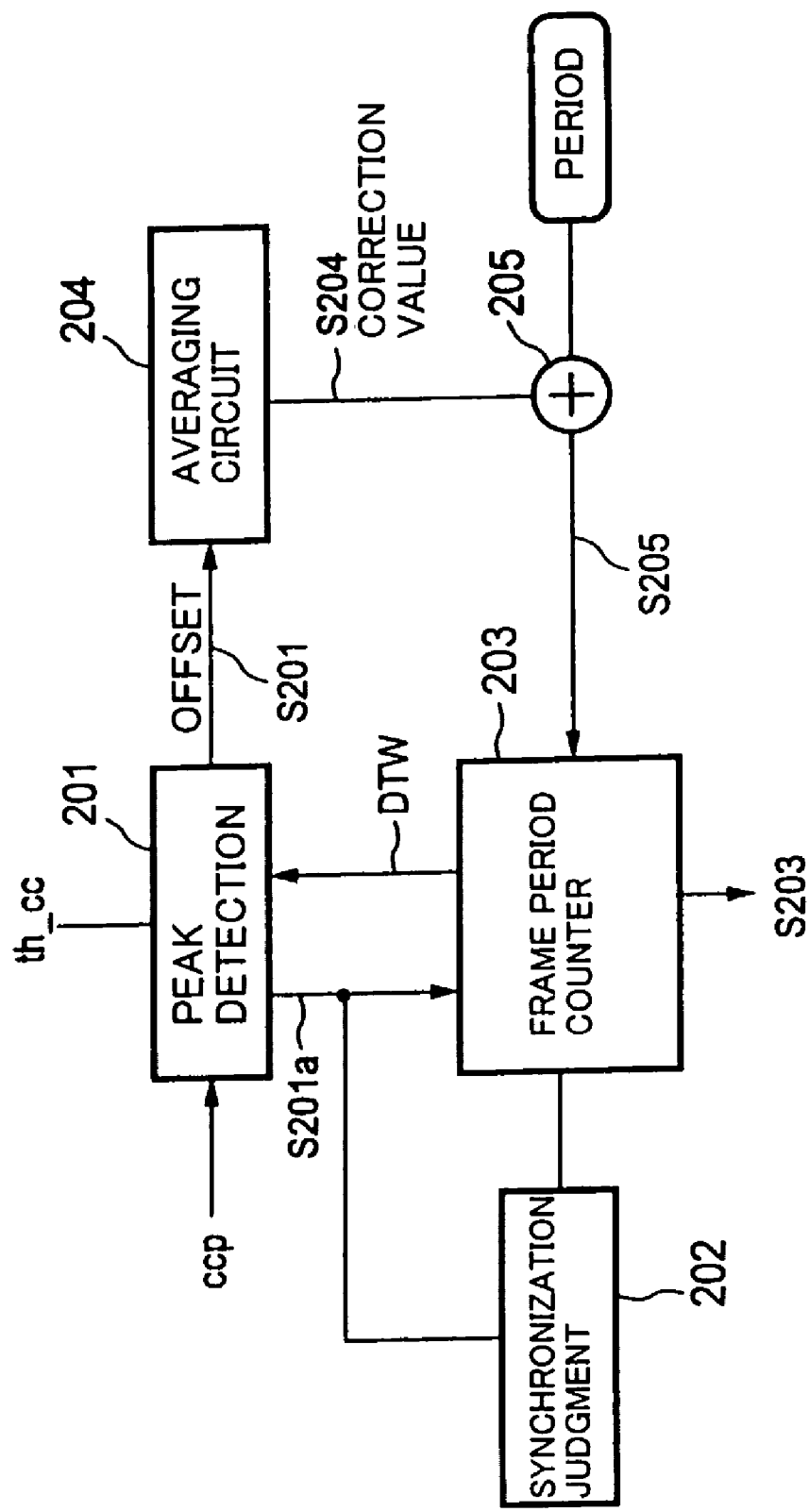
FIG. 28 is a block diagram of an example of the configuration of a frame synchronization circuit of FIG. 27.

FIG. 28 is a block diagram showing an example of the configuration of the frame synchronization circuit of FIG. 27.

The frame synchronization circuit 11004 has, as shown in FIG. 28, a peak detection circuit 201, a synchronization judgment circuit 202, a frame period counter 203, an averaging circuit 204, and an adder 205 as a correction value setting circuit.

The peak detection circuit 201 receives as input the cross-correlation power CCP formed by the cross-correlation absolute value calculation circuit 10916 of the burst detector 109A, performs peak detection only for values in the detection window DW set centered on an expected timing set by the frame period counter 203 and exceeding the threshold value th_cc, and outputs offset between the expected timing and the peak detection position as the signal S106 to the averaging circuit 204.

Further, when detecting a peak in the detection window DW, the peak detection circuit 204 judges that correlation is not detected and does not output the signal S201 indicating the amount of offset to the averaging circuit 204 when the peak value does not exceed the threshold value th_cc (when less than the threshold value).

Further, when first frame synchronization is pulled-in, the peak detection circuit 201 detects the peak of correlation in a state with the detection window open all the time and starts control deeming the time the detection threshold value th_cc is first exceeded to be detection of synchronization.

The synchronization judgment circuit 202 receives an output signal S201a of the peak detection circuit 201 and judges if synchronization is detected or not. When synchronization is detected, it sets the frame period counter 203, for example, to a count (for example, 0) of the expected timing of the synchronization detection by the output signal 201a of the peak detection circuit 201.

The frame period counter 203 is a counter for counting frame periods by a local reference clock, uses the set count value as an operating period, and generates a window timing of the detection window DW for instructing the peak detection circuit 201 based on this operation period.

Note that after synchronization is established, the detection window is set based on the frame periods counted by the reference clock of the receiving side (mobile station side).

Further, the frame period counter 203 is loaded with a correction value by output of the adder 205 as a signal S205 and corrects the count value.

Then, the frame period counter 203 outputs the signal S203 to the timing counter 11003A for finely adjustment of the output timing of the FFT timing signal TFFT by the expected timing based on the corrected count.

The averaging circuit 204 averages the offsets between the results of peak detection of the frame synchronization input as the signal S201 from the peak detection circuit 201 and the expected timing of the detection of synchronization from the frame period counter 203 and outputs the result as a correction value S204 to the adder 205.

The averaging circuit 204 includes an accumulating circuit, uses a certain range of the higher bits (whole number part) in the output as a first correction value ADJ1, accumulates the lower bit (decimal part) part obtained by subtracting the higher bits including the signs by an accumulating circuit for every frame, adds correction of a second correction value ADJ2, for example, ±1, to the first correction value ADJ1 corresponding to the carry period, and outputs the result as the correction value S204 to the adder 205.

Figure 29:
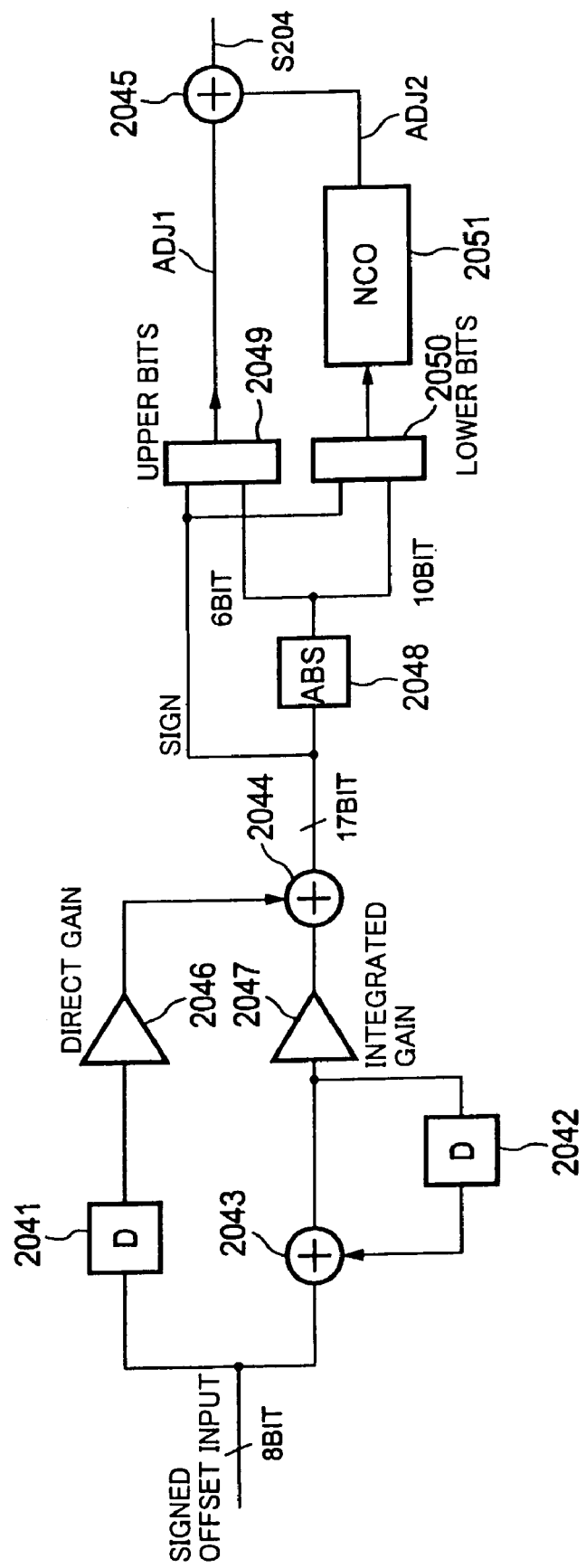
FIG. 29 is a circuit diagram of an example of the configuration of an averaging circuit of FIG. 28.

FIG. 29 is a circuit diagram showing an example of the configuration of the averaging circuit 204 of FIG. 28.

The averaging circuit 204 has, as shown in FIG. 29, delay units 2041 and 2042, adders 2043, 2044, and 2045, amplifiers 2046 and 2047, an absolute value calculation circuit 2048, selectors 2049 and 2050, and a numerical control oscillator (NCO) 2051.

The delay units 2041 and 2042, the adders 2043 and 2044, and the amplifiers 2046 and 2047 form an integrating circuit.

The averaging circuit 204 of FIG. 29 is that of a case wherein the value of the offset is 8 bits with a sign and the output of the averaging circuit 204 is 17 bits with a sign.

While depending on the direct and integrated gain setting of the integrating circuit, if deeming the higher 7 bits as the "whole number" part, the result is a maximum 9 bit shift. This is equivalent to an average of about 500 times.

Then, by inputting the lower bit parts into the numerical control oscillator (NCO) 2051, the offsets below the decimal point are added together. When reaching the equivalent of one clock, this is added with the above-mentioned whole number part at the adder 2045 to form the correction data S204.

Due to this configuration, in the above example, the reference clock error between the transmitting side (base station) and the receiving side (mobile station) can be corrected with an accuracy of about 1/1000 of a clock.

This means that the frame synchronization is maintained even if a transmission condition in which the detection of correlation of frame synchronization cannot be performed continues for hundreds of frames. After the transmission condition is restored, the transmitting/receiving operation can be immediately switched to.

Figure 30:
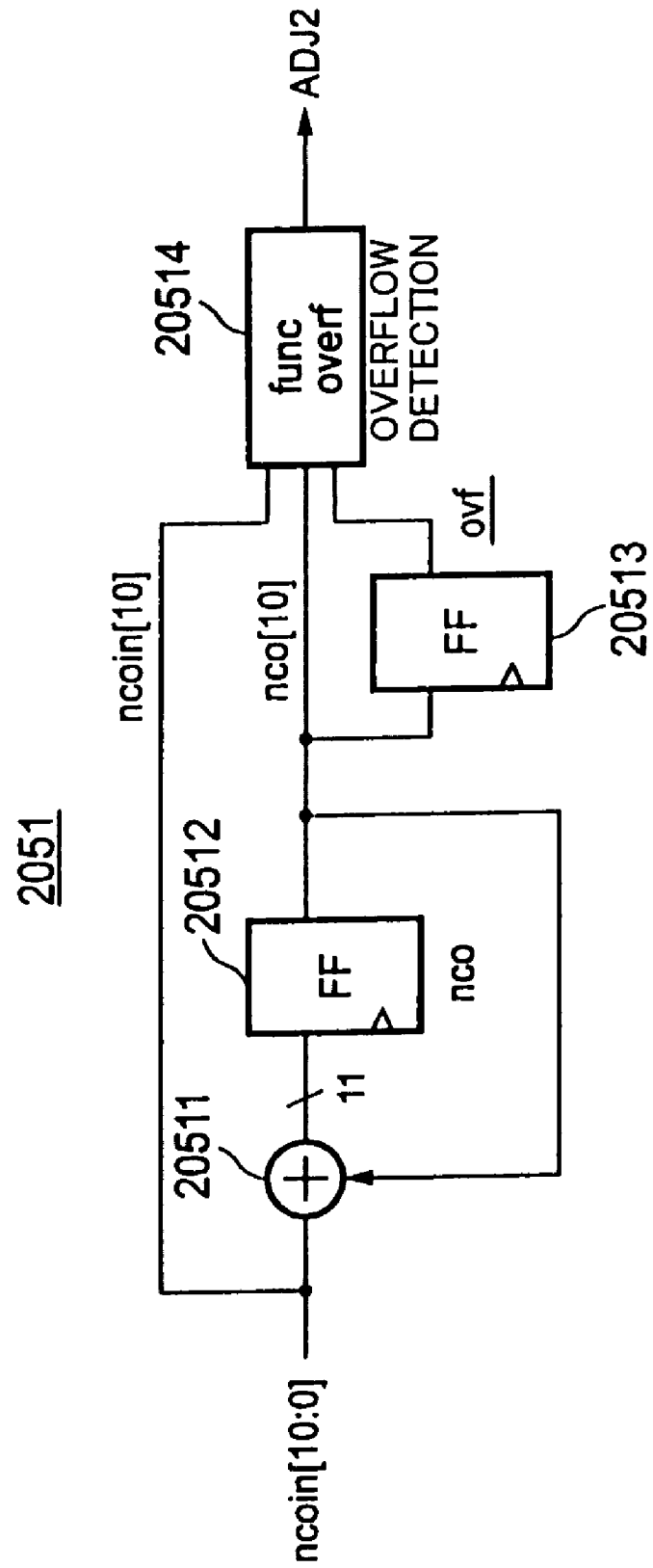
FIG. 30 is a circuit diagram of an example of the configuration of a numerical control oscillator (NCO) of FIG. 29.

FIG. 30 is a circuit diagram showing an example of the configuration of the numerical control oscillator (NCO) of FIG. 29.

The numerical control oscillator 2051 has, as shown in FIG. 30, an adder 20511, flip-flops (FF) 20512 and 20513, and an overflow detection circuit 20514.

Namely, the numerical control oscillator 2051 is comprised of an integrating circuit having a bit width the same as an input bit width.

Figure 31A:
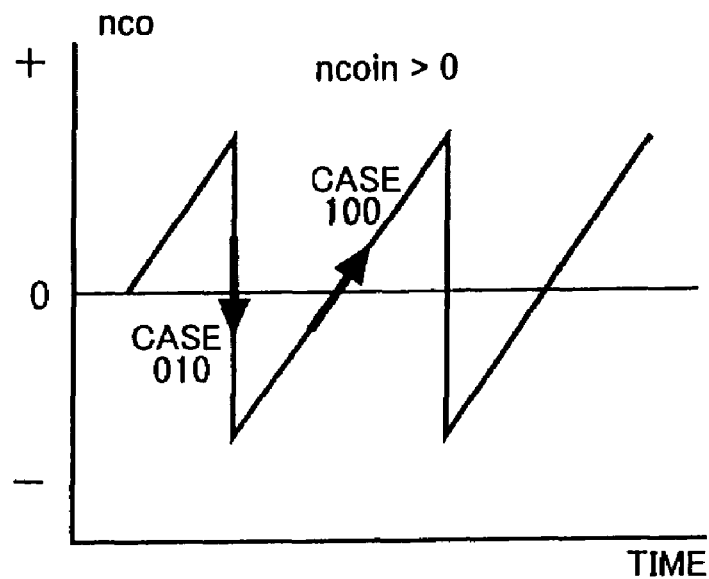
FIG. 31A and FIG. 31B are views of the state of accumulation of lower bits of the numerical control oscillator (NCO) of FIG. 29
Figure 31B:
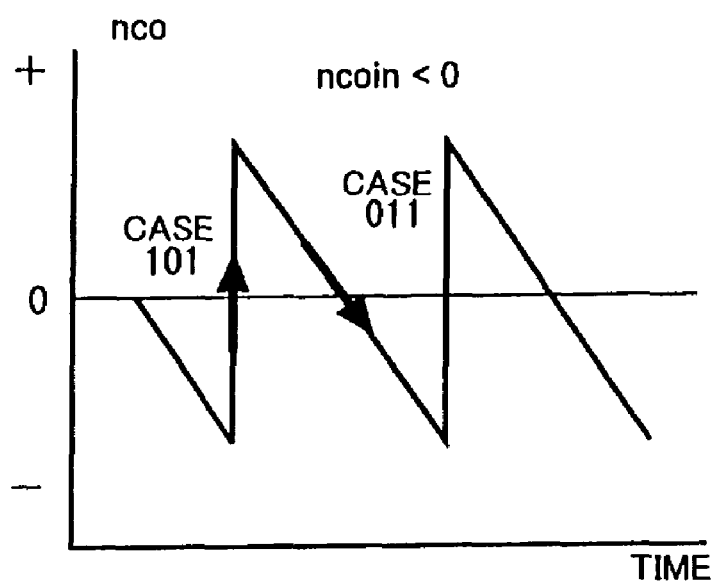

FIG. 31A and FIG. 31B are views showing the state of accumulating lower bits.

FIG. 31A shows a case where an input ncoin is greater than 0, while FIG. 31B shows a case where the input ncoin is less than 0.

The case when a sign is given and the 11 bit input ncoin is greater than 0 is the case where the input ncoin is "010 (hexadecimal)" and "100 (hexadecimal)", while the case when the input ncoin is less than 0 is a case where the input ncoin is "101 (hexadecimal)" and "011 (hexadecimal)".

Then, at the time of overflow and zero cross, a carry is output as the second correction value ADJ2 (±1).

FIG. 32 is a view showing the state showing overflow detection of the numerical control oscillator of FIG. 30.

As shown in FIG. 32, the second correction value ADJ2 is 0 in the case of default.

In the case of "010", the input ncoin [10] is 0, an output nco [10] of the flip-flop 20512 is 1, and an output ovf of the flip-flop 20513 is 0. The nco status in this case becomes ncoin>0 and nco overflow, so the second correction value ADJ2 becomes +1.

In the case of "b 011", the input ncoin [10] is 1, the output nco [10] of the flip-flop 20512 is 1, and the output ovf of the flip-flop 20513 is 0. The nco status in this case is ncoin<0 and nco zero cross, so the second correction value ADJ2 becomes −1.

In the case of "100", the input ncoin [10] is 0, the output nco [10] of the flip-flop 20512 is 0, and the output ovf of the flip-flop 20513 is 1. The nco status in this case is ncoin>0 and nco zero cross, so the second correction value ADJ2 becomes +1.

In the case of "101", the input ncoin [10] is 1, the output nco [10] of the flip-flop 20512 is 0, and the output ovf of the flip-flop 20513 is 1. The nco status in this case is ncoin<0 and nco underflow, so the second correction value ADJ2 becomes −1.

The adder 205 adds the correction value of the averaging circuit 204 to a reference period and sets a result thereof as a correction value of the frame period of the frame period counter 203 as a count thereof.

Next, the operation of the frame synchronization circuit 11004 of FIG. 28 will be explained with reference to FIGS. 33A to 33D, FIGS. 34A to 34D, and FIGS. 35A to 35D.

FIG. 33A to FIG. 33D and FIG. 34A to FIG. 34D are time charts showing an example of the operation timing of frame synchronization according to the present second embodiment.

Note that FIG. 33A shows a detection window DTW, FIG. 33B shows the cross-correlation power CCP, FIG. 33C shows the signal S201 indicating offset, and FIG. 33D shows a count value CNT of the frame period counter 203.

Similarly, FIG. 34A shows the detection window DTW, FIG. 34B shows the cross-correlation power CCP, FIG. 34C shows the signal S201 indicating offset, and FIG. 34D shows the count CNT of the frame period counter 203.

Further, FIG. 35A to FIG. 35D are timing charts showing an example of the operation timing at the time of initial pulling-in of frame synchronization according to the present second embodiment.

FIG. 35A shows the detection window DTW, FIG. 35B shows the cross-correlation power CCP, FIG. 35C shows a continuous synchronization number CSN, and FIG. 35D shows a synchronization flag FLG.

First, an operation of the frame synchronization will be explained with reference to FIGS. 33A to 33D.

In this case, the detection window DTW, as shown in FIG. 33A and FIG. 33D, is set to a width of 7 clocks centered on the count value 100.

In this example, a peak of the actual cross-correlation power (correlation value) CCP, as shown in FIG. 33B and FIG. 33D, is not obtained at the count value 100 but obtained at 98 shifted 2 clocks from 100 at the peak detection circuit 201.

This means that the frame period counted by the reference clock of the base station is longer than the frame period counted by the reference clock of the mobile station side. That is, the crystal oscillation frequency of the mobile station side is high.

In such a case, if making the value of the frame counter +2, at the next frame, a correlation peak is ideally obtained at the same position 98 in the next frame.

This offset +2 is input as the signal S201 to the averaging circuit 204. The correction value output approaches +2 from 0 along with an increase in the number of the reception frames.

Due to this, the peak detection of the correlation value can be obtained at the count value 100 of the expected timing.

Next, the operation of frame synchronization will be explained with reference to FIGS. 34A to 34D. The operation in the case where the correlation value in the detection window does not exceed the threshold value is shown.

This state occurs when, for example, the reception condition temporarily deteriorates.

In such a case, the correlation peak in the detection window DTW is not necessarily significant.

Controlling the frame period counter based on such peak detection timing becomes a cause of offset of frame synchronization.

For this reason, if the correlation value does not exceed the threshold value, the count value of the frame period counter 203 is not corrected and data is not input to the averaging circuit 204.

Next, the operation at the time of initial pulling in of synchronization will be explained with reference to FIG. 35A to FIG. 35D.

When the first frame synchronization is pulled-in, the peak of the cross correlation value is detected in a state with the detection window open all the time and control is started deeming the time the threshold value is first exceeded to be detection of synchronization. In this example, the synchronization judgment circuit 20 judges that synchronization is established with three consecutive detections of synchronization.

If the peak of the correlation value can be detected at this timing in subsequent detections, the frame synchronization is obtained, whereas if correlation cannot be detected consecutively at the same timing, the first detection is considered to be an erroneous detection and, as shown in FIG. 35C, the initial correlation detection wait mode is returned to.

According to the present second embodiment, in addition to the above explained effects of the first embodiment, frame synchronization once established can be maintained for a relatively long period in wireless communication where the channel conditions are unstable.

Further, when the frame period of a base station must be compliant with another system such as in the Wireless 1394 system, there is the advantage that the inherently mutually contradictory performances of the precision of synchronization and compliance can both be achieved.

As a result, irrespective of the channel conditions, it is possible to set an optimal FFT timing.

Note that in the above explained second embodiment, a case of using one threshold value as the threshold value for peak detection was explained as an example, however, various modifications may be made such as using a plurality of threshold values to control the setting of the counter and the loading of offset in the averaging circuit.

Finer control is also possible such as, for example, using a first threshold value and a second threshold value less than the first threshold value to set the counter or load offset when the peak of the correlation value is greater than the first threshold value and not set the counter, but load offset when less than the second threshold value.

INDUSTRIAL APPLICABILITY

Since the demodulation timing generation circuit and demodulation apparatus according to the present invention can set the optimal FFT timing irrespective of the channel conditions, can make the width of the detection window variable according to the conditions, can set the width in accordance with the reception condition, and can efficiently set the optimal FFT timing corresponding to the channel, they can be applied to a wireless communication system etc. receiving a radio signal modulated by for example the OFDM modulation method and having a preamble signal value added to the modulated packet signal.

Further, since the demodulation timing generation circuit and demodulation apparatus of the present invention can continuously maintain frame synchronization once established for a relatively long time, they can be applied to a wireless communications system where the channel conditions are unstable.

Further, since the demodulation timing generation circuit and demodulation apparatus of the present invention can achieve both of the inherently contradictory performances of precision of synchronization and compliance, they can be applied to a wireless communications system where the frame period of the base station must be compliant with another system such as the Wireless 1394 system.

The invention claimed is:

1. A demodulation timing generation circuit for generating a timing signal for starting demodulation of a reception signal having a burst portion comprising:
    a burst detector for performing a correlation operation in the burst portion of the reception signal;
    a peak position detection unit for setting a detection window based on the correlation operation result and detecting a peak of a correlation power and a position of the peak within a period of the detection window; and
    an output unit for outputting the timing signal after a predetermined time from a detected peak position by the peak position detection unit,
    wherein a window width for detecting a peak of the correlation result is variable and is set to a width in accordance with a reception condition.

2. A demodulation timing generation circuit as set forth in claim 1, wherein the peak position detection unit is set a lower limit to the correlation value to be detected and,
when the correlation value is less than the lower limit, does not deem a peak has been detected.

3. A demodulation timing generation circuit as set forth in claim 1, wherein:
the burst detector performs a cross-correlation operation and the peak position detection unit detects a peak of a cross-correlation power and the peak position.

4. A demodulation timing generation circuit for generating a timing signal for starting demodulation of a reception signal having a burst portion, comprising:
a burst detector for performing a correlation operation in the burst portion of the reception signal;
a peak position detection unit for setting a detection window based on the correlation operation result and detecting a peak of a correlation power and a position of the peak within a period of the detection window; and
an output unit for outputting the timing signal after a predetermined time from a detected peak position by the peak position detection unit,
wherein the burst detector performs an auto-correlation operation and cross-correlation operation and the peak position detection unit sets a detection window based on the auto correlation operation result and detects a peak of a cross-correlation power and a position of the peak within a period of the detection window.

5. A demodulation timing generation circuit for generating a timing signal for starting demodulation of a reception signal having a burst portion comprising:
a burst detector for performing a correlation operation in the burst portion of the reception signal;
a peak position detection unit for setting a detection window based on the correlation operation result and detecting a peak of a correlation power and a position of the peak within a period of the detection window;
a counter for counting a symbol section and, if a preset timing data value is counted, outputs a timing signal; and
a position timing conversion unit for presetting timing data corresponding to a peak position detected at the peak position detection unit to the counter,
wherein the peak position detection unit performs peak detection by comparing a previously output maximal value with a size of a present correlation input and stores a timing of a window where the maximal value was obtained to finalize a peak position at an end of the detection window.

6. A demodulation timing generation circuit as set forth in claim 5, wherein the position timing conversion unit generates timing data based on a relative relationship between a rear edge of a detection window and a peak position and presets the timing data to the counter.

7. A demodulation timing generation circuit as set forth in claim 5, wherein a window width for detecting a peak of the correlation result is variable and is set to a width in accordance with a reception condition.

8. A demodulation timing generation circuit as set forth in claim 6, wherein a window width for detecting a peak of the correlation result is variable and is set to a width in accordance with a reception condition.

9. A demodulation timing generation circuit as set forth in claim 5, wherein the peak position detection unit is set a lower limit to a correlation value to be detected and, when the correlation value is less than the lower limit, does not deem a peak has been detected.

10. A demodulation timing generation circuit as set forth in claim 6, wherein the peak position detection unit is set a lower limit to a correlation value to be detected and, when the correlation value is less than the lower limit, does not deem a peak has been detected.

11. A demodulation timing generation circuit as set forth in claim 5, wherein:
the burst detection unit performs a cross-correlation operation, and the peak position detection unit detects a peak of a cross-correlation power and a position of the peak.

12. A demodulation timing generation circuit as set forth in claim 6, wherein:
the burst detection unit performs a cross-correlation operation, and the peak position detection unit detects a peak of a cross-correlation power and a position of the peak.

13. A demodulation timing generation circuit as set forth in claim 5, wherein:
the burst detection unit performs an auto-correlation operation and cross-correlation operation, and the peak position detection unit sets a detection window based on the auto-correlation operation result and detects a peak of a cross-correlation power and a position of the peak within the detection window period.

14. A demodulation timing generation circuit as set forth in claim 6, wherein:
the burst detection unit performs an auto-correlation operation and cross-correlation operation, and the peak position detection unit sets a detection window based on the auto-correlation operation result and detects a peak of the cross-correlation power and a position of the peak within the detection window period.

15. A demodulation timing generation circuit for generating a timing signal for starting demodulation of a reception signal having a burst portion, comprising:
a burst detector for performing a correlation operation in the burst portion of the reception signal;
a peak position detection unit for setting a detection window based on the correlation operation result and detecting a peak of a correlation power and a position of the peak within a period of the detection window;
a counter for counting a symbol section and, if a preset timing data value is counted, outputs a timing signal; and
a position timing conversion unit for presetting timing data corresponding to a peak position detected at the peak position detection unit to the counter,
wherein the counter cyclically counts one symbol once preset and outputs the timing signal at a constant timing at every symbol.

16. A demodulation timing generation circuit as set forth in claim 15, wherein:
the counter is a down counter; and
the position timing conversion unit changes a load data value of the counter after the counter has counted down to 0.

17. A demodulation timing generation circuit for generating a timing signal for starting demodulation of a reception signal having a burst portion including at least a preamble signal and a reference signal following the preamble signal added to a header portion of the data symbol, comprising:
a burst detector for performing an auto-correlation operation at a preamble signal portion of a front half portion of the burst portion of the reception signal and performing a cross-correlation operation at a reference signal portion of the rear half thereof;

a peak position detection unit for setting a detection window based on the auto-correlation operation result and detecting a peak of the cross-correlation power and a position of the peak within a period of the detection window; and an output unit for outputting a timing signal after a predetermined time from a detected peak position at the peak position detection unit, wherein a window width for detecting a peak of the cross-correlation result is variable and is set to a width in accordance with a reception condition.

18. A demodulation timing generation circuit as set forth in claim 17, wherein the peak position detection unit is set a lower limit to a correlation value to be detected and, when the correlation value is less than the lower limit, does not deem a peak has been detected.

19. A demodulation timing generation circuit for generating a timing signal for starting demodulation of a reception signal having a frame synchronization signal in which a burst portion serving as a synchronization training signal is added to a header portion of a data symbol, comprising:

a burst detector for performing a correlation operation in the burst portion of the frame synchronization signal;

a peak detection circuit for performing peak detection of a correlation power by the burst detection unit for peaks in a detection window set centered around an expected timing and exceeding a detection threshold value and outputting a signal indicating an offset between the expected timing and a peak detection position;

a frame period counter for counting a frame period by a reference clock, which counter uses a set count as an operation period, generates a window timing of a detection window for instructing the peak detection circuit based on the operation period, and instructs to output the timing signal at a timing in accordance with the expected timing based on the set count;

an averaging circuit for averaging an offset between a result of peak detection of frame synchronization by the peak detection circuit and the expected timing of synchronization detection by the frame period counter and outputting a result thereof as a correction value; and a correction value setting circuit for setting a period corrected by a correction value by the averaging circuit as the count value to the frame period counter.

20. A demodulation timing generation circuit as set forth in claim 19, wherein when the peak detection circuit performs peak detection in the detection window and a peak value thereof does not exceed a detection threshold value, it judges that correlation is not detected and does not output a signal indicating an offset to the averaging circuit.

21. A demodulation timing generation circuit as set forth in claim 19, wherein when first frame synchronization is pulled-in, the peak detection circuit detects the peak of correlation in a state where a detection window is opened all the time and deems synchronization was detected at the point a peak value first exceeds a threshold value.

22. A demodulation timing generation circuit as set forth in claim 21, further comprising:

a synchronization judgment circuit for judging if synchronization was detected or not upon receiving an output signal of a peak detection circuit and, in the case synchronization was detected, setting a count value of the expected timing of the synchronization detection of the frame period counter by the output signal of the peak detection circuit.

23. A demodulation timing generation circuit as set forth in claim 19, wherein the averaging circuit includes an integrating circuit, uses a certain range of higher bits in an output as a first correction value, accumulates lower bits obtained by subtracting the higher bits, including the sign, at every frame by the accumulating circuit, adds a second correction value to the first correction value corresponding to a carry period thereof, and outputs the result as the correction value to the correction value setting circuit.

24. A demodulation timing generation circuit as set forth in claim 19, wherein the burst detector performs a cross-correlation operation at a reference signal portion of a rear half portion of the burst portion of the reception signal.

25. A demodulation apparatus for demodulating a reception signal having a burst portion, comprising:

a burst detector for performing a correlation operation in the burst portion of the reception signal;

a peak position detection unit for setting a detection window based on the correlation operation result and detecting a peak of a correlation power and a position of the peak within a period of the detection window;

an output unit for outputting a timing signal after a predetermined time from a detected peak position by the peak position detection unit; and a demodulation unit for performing a Fourier transform on the reception signal to demodulate the same upon receiving the timing signal output from the output unit, wherein the peak position detection unit performs peak detection by comparing a previously output maximal value with a size of a present correlation input and stores a timing of a window where the maximal value was obtained to finalize a peak position at an end of the detection window.

26. A demodulation apparatus as set forth in claim 25, wherein: the apparatus further comprises:

an automatic gain control amplifier for amplifying an input reception signal level with a gain in accordance with a gain control signal and outputting the result to the burst detector and the demodulation unit;

the burst detector performs the burst detection based on a correlation operation of the amplified reception signal and outputs a burst synchronization detection signal; and the apparatus further comprises an amplification gain controller for outputting the gain control signal to the automatic gain control amplifier so that amplification is performed with a gain in accordance with a reception signal power value upon receiving the burst synchronization detection signal by the burst detector.

27. A demodulation apparatus as set forth in claim 25, wherein the reception signal is modulated based on an orthogonal frequency division multiplexing method.

28. A demodulation apparatus for demodulating a reception signal having a burst portion, comprising:

a burst detector for performing a correlation operation in the burst portion of the reception signal;

a peak position detection unit for setting a detection window based on the correlation operation result and detecting a peak of a correlation power and a position of the peak within a period of the detection window;

a counter for counting a symbol section and, if counting a preset timing data value, outputs a timing signal;

a position timing conversion unit for presetting timing data corresponding to a peak position detected at the peak position detection unit to the counter; and a demodulation unit for performing a Fourier transform on the reception signal to demodulate the same upon receiving the timing signal output from the counter, wherein the peak position detection unit performs peak detection by comparing a previously output maximal value with a size of a present correlation input and stores a timing of a window where the maximal value was obtained to finalize a peak position at an end of the detection window.

29. A demodulation apparatus as set forth in claim 28, wherein the apparatus further comprises:

an automatic gain control amplifier for amplifying an input reception signal level with a gain in accordance with a gain control signal and outputting the result to the burst detector and the demodulation unit;

the burst detector performs the burst detection based on a correlation operation of the amplified reception signal and outputs a burst synchronization detection signal; and the apparatus further comprises an amplification gain controller for outputting the gain control signal to the automatic gain control amplifier so that amplification is performed with a gain in accordance with a reception signal power value upon receiving the burst synchronization detection signal by the burst detector.

30. A demodulation apparatus as set forth in claim 28, wherein the reception signal is modulated based on an orthogonal frequency division multiplexing method.

31. A demodulation apparatus for generating a timing signal for starting demodulation of a reception signal having a frame synchronization signal in which a burst portion serving as a synchronization training signal is added to a header portion of a data symbol, comprising:

a burst detector for performing a correlation operation in the burst portion of the frame synchronization signal;

a peak detection circuit for performing peak detection of a correlation power by the burst detection unit for peaks only in a detection window set centered around an expected timing and exceeding a detection threshold value and outputting a signal indicating an offset between the expected timing and a peak detection position;

a frame period counter for counting a frame period by a reference clock, which counter uses a set count as an operation period and generated a window timing of a detection window for instructing the peak detection circuit based on the operation period, and instructs so that the timing signal is output at a timing in accordance with the expected timing based on the set count;

an averaging circuit for averaging an offset between a result of peak detection of frame synchronization by the peak detection circuit and the expected timing of a synchronization detection by the frame period counter and outputting a result thereof as a correction value;

a correction value setting circuit for setting a period corrected by a correction value by the averaging circuit as the count value to the frame period counter; and a demodulation unit for performing a Fourier transform on the reception signal and demodulating the same upon receiving a timing signal in accordance with an instruction output from the frame period counter.

32. A demodulation apparatus as set forth in claim 31, wherein when the peak detection circuit performs peak detection in the detection window and a peak value thereof does not exceed a detection threshold value, it judges that correlation is not detected and does not output a signal indicating an offset to the averaging circuit.

33. A demodulation apparatus as set forth in claim 31, wherein when first frame synchronization is pulled-in, the peak detection circuit detects the peak of correlation in a state where a detection window is opened all the time and deems synchronization was detected at the point a peak value first exceeds a threshold value.

34. A demodulation apparatus as set forth in claim 33, further comprising:

a synchronization judgment circuit for judging if synchronization was detected or not upon receiving an output signal of a peak detection circuit and, in the case synchronization was detected, setting a count value of the expected timing of the synchronization detection of the frame period counter by the output signal of the peak detection circuit.

35. A demodulation apparatus as set forth in claim 31, wherein the averaging circuit includes an integrating circuit, uses a certain range of higher bits (whole number part) in an output as a first correction value, accumulates lower bits (decimal part) obtained by subtracting the higher bits, including the sign, at every frame by an accumulating circuit, adds a second correction value to the first correction value corresponding to a carry period thereof and outputs the result as the correction value to the correction value setting circuit.

36. A demodulation apparatus as set forth in claim 31, wherein the burst detector performs a cross-correlation operation at a reference signal portion of a rear half portion of the burst portion of the reception signal.

37. A demodulation apparatus as set forth in claim 31, wherein the reception signal is modulated based on an orthogonal frequency division multiplexing method.

* * * * *